United States Patent
Batwara et al.

(10) Patent No.: US 9,519,647 B2
(45) Date of Patent: Dec. 13, 2016

(54) DATA EXPIRY IN A NON-VOLATILE DEVICE

(71) Applicant: Fusion-io, Inc., Salt Lake City, UT (US)

(72) Inventors: Ashish Batwara, Fremont, CA (US); Swaminathan Sundararaman, Santa Clara, CA (US); James Peterson, San Jose, CA (US); Nisha Talagala, Livermore, CA (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 301 days.

(21) Appl. No.: 13/748,559

(22) Filed: Jan. 23, 2013

(65) Prior Publication Data

US 2013/0275391 A1  Oct. 17, 2013

Related U.S. Application Data

(60) Provisional application No. 61/625,614, filed on Apr. 17, 2012, provisional application No. 61/637,179, filed on Apr. 23, 2012, provisional application No. 61/705,079, filed on Sep. 24, 2012.

(51) Int. Cl.
   *G06F 17/30* (2006.01)
(52) U.S. Cl.
   CPC ... *G06F 17/30085* (2013.01); *G06F 17/30082* (2013.01); *G06F 17/30221* (2013.01)
(58) Field of Classification Search
   None
   See application file for complete search history.

(56) References Cited

U.S. PATENT DOCUMENTS

| | | | |
|---|---|---|---|
| 5,794,253 A * | 8/1998 | Norin et al. | G06F 17/30 |
| 7,680,830 B1 * | 3/2010 | Ohr | G06F 17/30085 |
| | | | 707/999.2 |
| 8,392,428 B1 | 3/2013 | Bonwick et al. | |
| 8,578,126 B1 * | 11/2013 | Gaonkar et al. | 711/201 |
| 8,589,362 B1 * | 11/2013 | Braam et al. | 707/695 |
| 2001/0037407 A1 * | 11/2001 | Dragulev | G06F 17/30867 |
| | | | 709/250 |
| 2003/0028652 A1 * | 2/2003 | Bardini | H04N 5/765 |
| | | | 709/229 |
| 2005/0076185 A1 | 4/2005 | Bhatti | |
| 2006/0047924 A1 * | 3/2006 | Aoshima et al. | 711/161 |
| 2006/0200700 A1 * | 9/2006 | Malcolm | 714/38 |
| 2006/0235869 A1 * | 10/2006 | Nagahashi et al. | 707/102 |
| 2008/0109543 A1 * | 5/2008 | Abanami et al. | 709/223 |
| 2008/0154776 A1 * | 6/2008 | Xia | G06F 8/62 |
| | | | 705/51 |

(Continued)

OTHER PUBLICATIONS

"Couchbase Server Manual 1.8", Couchbase, Feb. 13, 2012, pp. 157, http://www.couchbase.com/docs/couchbase-manual-1.8/index.html.

(Continued)

*Primary Examiner* — Son T Hoang
(74) *Attorney, Agent, or Firm* — Kunzler Law Group, PC

(57) ABSTRACT

Apparatuses, systems, and methods for data expiry include examining metadata associated with data in a non-volatile recording medium. Apparatuses, systems, and methods include expiring data from a non-volatile recording medium in response to metadata indicating that an expiration period for the data has been satisfied.

27 Claims, 11 Drawing Sheets

(56) References Cited

U.S. PATENT DOCUMENTS

2011/0276578 A1* 11/2011 Allalouf et al. .............. 707/755
2011/0276744 A1  11/2011 Sengupta et al.
2012/0089797 A1   4/2012 Shibayama et al.
2012/0102298 A1   4/2012 Sengupta et al.
2013/0055249 A1   2/2013 Vaghani et al.
2013/0103729 A1   4/2013 Cooney et al.
2013/0117227 A1   5/2013 Kruglick

OTHER PUBLICATIONS

U.S. Appl. No. 13/590,107, Office Action, Aug. 11, 2014.

\* cited by examiner

DATA EXPIRY IN A NON-VOLATILE DEVICE

CROSS-REFERENCES TO RELATED APPLICATIONS

This application claims the benefit of U.S. Provisional Patent Application No. 61/625,614 entitled "APPARATUS, SYSTEM, AND METHOD FOR A KEY VALUE STORE" and filed on Apr. 17, 2012 for David Flynn et al., of U.S. Provisional Patent Application No. 61/637,179 entitled "APPARATUS, SYSTEM, AND METHOD FOR A KEY VALUE STORE" and filed on Apr. 23, 2012 for David Flynn et al., and of U.S. Provisional Patent Application No. 61/705,079 entitled "APPARATUS, SYSTEM, AND METHOD FOR A KEY-VALUE STORE" and filed on Sep. 24, 2012 for Nisha Talagala et al., which are incorporated herein by reference.

TECHNICAL FIELD

The present disclosure, in various embodiments, relates to data expiry and more particularly relates to data expiry in a non-volatile device.

BACKGROUND

Once data is stored in a non-volatile storage device, the device typically stores the data indefinitely, until the data is explicitly overwritten, deleted, or the like. If a user or other client of a storage device is no longer using data stored in the device, the device will continue to store the data, unnecessarily taking up storage capacity of the device, unless the device receives a command to overwrite or delete the data.

In certain storage devices, storing unused or unnecessary data may also cause write amplification (e.g., the rewriting or moving of data internally within a storage device). Write amplification can wear out a storage device, consume write bandwidth of a storage device, reduce a usable lifetime of a storage device, or otherwise reduce performance of a storage device.

SUMMARY

Methods for data expiry are presented. In one embodiment, a method includes examining metadata associated with data in a non-volatile recording medium. In another embodiment, a method includes expiring data from a non-volatile recording medium in response to metadata indicating that an expiration period for the data has been satisfied.

Apparatuses for data expiry are presented. In one embodiment, an apparatus includes a storage request module configured to receive a write request to store data in a non-volatile memory medium. A write request, in certain embodiments, has an associated expiration indicator. In a further embodiment, an apparatus includes a write module configured to store metadata for the data in a non-volatile memory medium. Metadata, in certain embodiments, may be associated with an expiration indicator. In another embodiment, an apparatus includes an expiry module configured to invalidate data in a non-volatile memory medium based on metadata for the data.

In another embodiment, an apparatus includes means for maintaining data and metadata associated with the data in a non-volatile recording medium. An apparatus, in a further embodiment, includes means for determining whether an expiration period for data has been satisfied based on metadata. In one embodiment, an apparatus includes means for expiring data from a non-volatile recording medium in response to determining that an expiration period for the data has been satisfied.

Systems for data expiry are presented. A non-volatile storage device, in certain embodiments, includes a non-volatile storage medium. In one embodiment, a write module is configured to preserve data and metadata associated with the data together in a sequential, log-based writing structure of a non-volatile storage device. An expiry module, in a further embodiment, is configured to expire data from a non-volatile storage device in response to metadata indicating that a timeout period for the data has been satisfied.

Computer program products are presented. In one embodiment, a computer program product comprises a computer readable storage medium storing computer usable program code. The computer usable program code, in certain embodiments, is executable to perform operations for data expiry. In one embodiment, an operation includes storing an indicator of an expiration period for data with data in a non-volatile memory medium. In a further embodiment, an operation includes expiring data from a non-volatile memory medium in response to an expiration period being satisfied.

BRIEF DESCRIPTION OF THE DRAWINGS

In order that the advantages of the disclosure will be readily understood, a more particular description of the disclosure briefly described above will be rendered by reference to specific embodiments that are illustrated in the appended drawings. Understanding that these drawings depict only typical embodiments of the disclosure and are not therefore to be considered to be limiting of its scope, the disclosure will be described and explained with additional specificity and detail through the use of the accompanying drawings, in which.

DETAILED DESCRIPTION

Figure 1A:
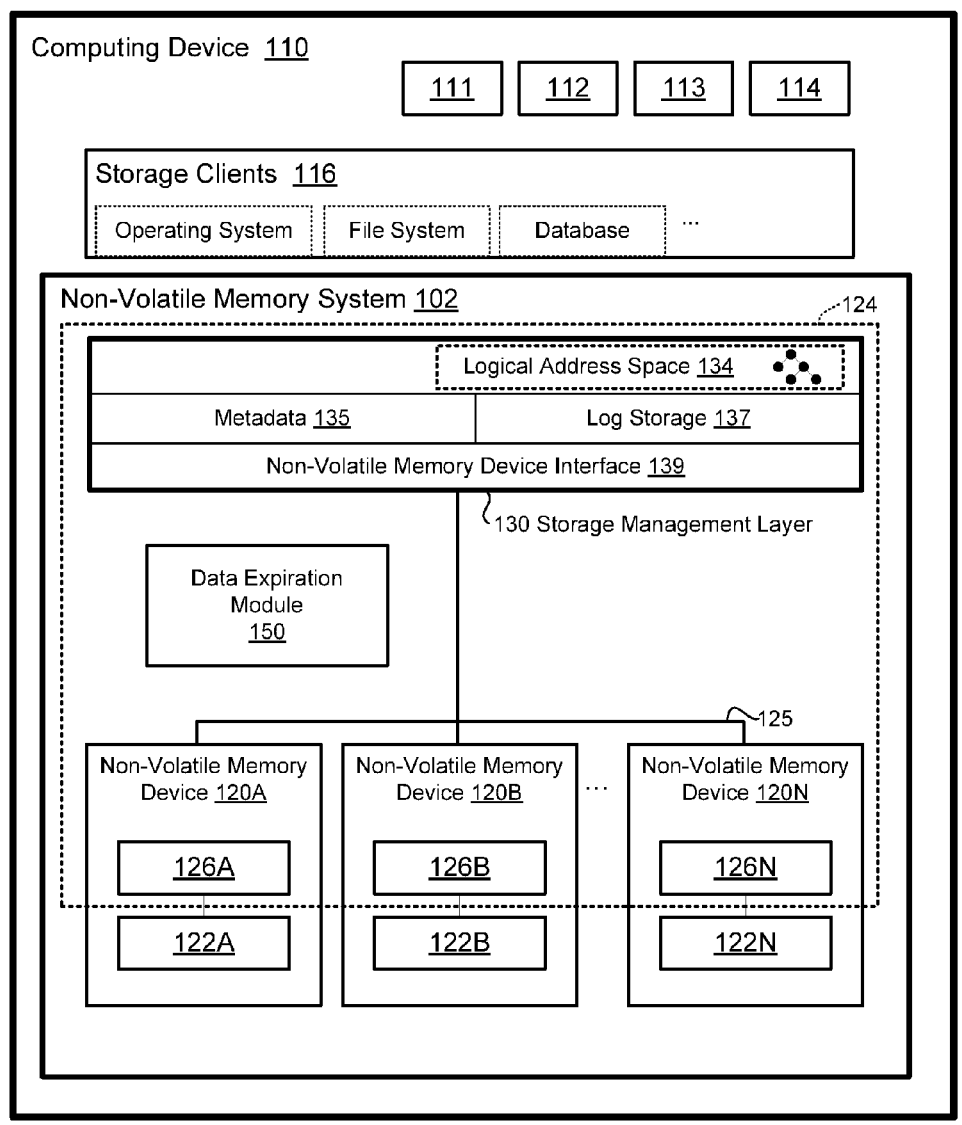
FIG. 1A is a schematic block diagram illustrating one embodiment of a system for data expiry.

Aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable storage media having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable storage media.

Any combination of one or more computer readable storage media may be utilized. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), a blu-ray disc, an optical storage device, a magnetic tape, a Bernoulli drive, a magnetic disk, a magnetic storage device, a punch card, integrated circuits, other digital processing apparatus memory devices, or any suitable combination of the foregoing, but would not include propagating signals. In the context of this document, a computer readable storage medium may be any tangible medium that can contain, or store a program for use by or in connection with an instruction execution system, apparatus, or device.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and i variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, structures, or characteristics of the disclosure may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the disclosure. However, the disclosure may be practiced without one or more of the specific details, or with other methods, components, materials, and so forth. In other instances, well-known structures, materials, or operations are not shown or described in detail to avoid obscuring aspects of the disclosure.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the schematic flowchart diagrams and/or schematic block diagrams block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

The description of elements in each figure may refer to elements of proceeding figures. Like numbers refer to like elements in all figures, including alternate embodiments of like elements.

According to various embodiments, a non-volatile memory controller manages one or more non-volatile memory devices. The non-volatile memory device(s) may comprise memory or storage devices, such as solid-state storage device(s), that are arranged and/or partitioned into a plurality of addressable media storage locations. As used herein, a media storage location refers to any physical unit of memory (e.g., any quantity of physical storage media on a non-volatile memory device). Memory units may include, but are not limited to: pages, memory divisions, erase blocks, sectors, blocks, collections or sets of physical storage locations (e.g., logical pages, logical erase blocks, described below), or the like.

The non-volatile memory controller may comprise a storage management layer (SML), which may present a logical address space to one or more storage clients. One example of an SML is the Virtual Storage Layer® of Fusion-io, Inc. of Salt Lake City, Utah. Alternatively, each non-volatile memory device may comprise a non-volatile memory media controller, which may present a logical address space to the storage clients. As used herein, a logical address space refers to a logical representation of memory resources. The logical address space may comprise a plurality (e.g., range) of logical addresses. As used herein, a logical address refers to any identifier for referencing a memory resource (e.g., data), including, but not limited to: a logical block address (LBA), cylinder/head/sector (CHS) address, a file name, an object identifier, an inode, a Universally Unique Identifier (UUID), a Globally Unique Identifier (GUID), a hash code, a signature, an index entry, a range, an extent, or the like.

The SML may maintain metadata, such as a forward index, to map logical addresses of the logical address space to media storage locations on the non-volatile memory device(s). The SML may provide for arbitrary, any-to-any mappings from logical addresses to physical storage resources. As used herein, an "any-to any" mapping may map any logical address to any physical storage resource. Accordingly, there may be no pre-defined and/or pre-set mappings between logical addresses and particular, media storage locations and/or media addresses. As used herein, a media address refers to an address of a memory resource that uniquely identifies one memory resource from another to a controller that manages a plurality of memory resources. By way of example, a media address includes, but is not limited to: the address of a media storage location, a physical memory unit, a collection of physical memory units (e.g., a logical memory unit), a portion of a memory unit (e.g., a logical memory unit address and offset, range, and/or extent), or the like. Accordingly, the SML may map logical addresses to physical data resources of any size and/or granularity, which may or may not correspond to the underlying data partitioning scheme of the non-volatile memory device(s). For example, in some embodiments, the non-volatile memory controller is configured to store data within logical memory units that are formed by logically combining a plurality of physical memory units, which may allow the non-volatile memory controller to support many different virtual memory unit sizes and/or granularities.

As used herein, a logical memory element refers to a set of two or more non-volatile memory elements that are or are capable of being managed in parallel (e.g., via an I/O and/or control bus). A logical memory element may comprise a plurality of logical memory units, such as logical pages, logical memory divisions (e.g., logical erase blocks), and so on. As used herein, a logical memory unit refers to a logical construct combining two or more physical memory units, each physical memory unit on a respective non-volatile memory element in the respective logical memory element (each non-volatile memory element being accessible in parallel). As used herein, a logical memory division refers to a set of two or more physical memory divisions, each physical memory division on a respective non-volatile memory element in the respective logical memory element.

The logical address space presented by the storage management layer may have a logical capacity, which may correspond to the number of available logical addresses in the logical address space and the size (or granularity) of the data referenced by the logical addresses. For example, the logical capacity of a logical address space comprising $2^{32}$ unique logical addresses, each referencing 2048 bytes (2 KiB) of data may be 2^43 bytes. (As used herein, a kibibyte (KiB) refers to 1024 bytes). In some embodiments, the logical address space may be thinly provisioned. As used herein, a "thinly provisioned" logical address space refers to a logical address space having a logical capacity that exceeds the physical capacity of the underlying non-volatile memory device(s). For example, the storage management layer may present a 64-bit logical address space to the storage clients (e.g., a logical address space referenced by 64-bit logical addresses), which exceeds the physical capacity of the underlying non-volatile memory devices. The large logical address space may allow storage clients to allocate and/or reference contiguous ranges of logical addresses, while reducing the chance of naming conflicts. The storage management layer may leverage the any-to-any mappings between logical addresses and physical storage resources to manage the logical address space independently of the underlying physical storage devices. For example, the storage management layer may add and/or remove physical storage resources seamlessly, as needed, and without changing the logical addresses used by the storage clients.

The non-volatile memory controller may be configured to store data in a contextual format. As used herein, a contextual format refers to a self-describing data format in which persistent contextual metadata is stored with the data on the physical storage medium. The persistent contextual metadata provides context for the data it is stored with. In certain embodiments, the persistent contextual metadata uniquely identifies the data that the persistent contextual metadata is stored with. For example, the persistent contextual metadata may uniquely identify a sector of data owned by a storage client from other sectors of data owned by the storage client. In a further embodiment, the persistent contextual metadata identifies an operation that is performed on the data. In a further embodiment, the persistent contextual metadata identifies a sequence of operations performed on the data (e.g., time sequence information). In a further embodiment, the persistent contextual metadata identifies security controls, a data type, or other attributes of the data. In a certain embodiment, the persistent contextual metadata identifies at least one of a plurality of aspects, including data type, a unique data identifier, an operation, and a sequence of operations performed on the data. The persistent contextual metadata may include, but is not limited to: a logical address of the data, an identifier of the data (e.g., a file name, object id, label, unique identifier, or the like), reference(s) to other data (e.g., an indicator that the data is associated with other data), a relative position or offset of the data with respect to other data (e.g., file offset, etc.), data size and/or range, and the like. The contextual data format may comprise a packet format comprising a data segment and one or more headers. Alternatively, a contextual data format may associate data with context information in other ways (e.g., in a dedicated index on the non-volatile memory medium, a memory division index, or the like).

In some embodiments, the contextual data format may allow data context to be determined (and/or reconstructed) based upon the contents of the non-volatile memory medium, and independently of other metadata, such as the arbitrary, any-to-any mappings discussed above. Since the media location of data is independent of the logical address of the data, it may be inefficient (or impossible) to determine the context of data based solely upon the media location or media address of the data. Storing data in a contextual format on the non-volatile memory medium may allow data context to be determined without reference to other metadata. For example, the contextual data format may allow the metadata to be reconstructed based only upon the contents of the non-volatile memory medium (e.g., reconstruct the any-to-any mappings between logical addresses and media locations).

In some embodiments, the non-volatile memory controller may be configured to store data on one or more asymmetric, write-once media, such as a solid-state storage medium. As used herein, a "write once" storage medium refers to a storage medium that is reinitialized (e.g., erased) each time new data is written or programmed thereon. As used herein, an "asymmetric" storage medium refers to a storage medium having different latencies for different storage operations. Many types of solid-state storage media are asymmetric; for example, a read operation may be much faster than a write/program operation, and a write/program operation may be much faster than an erase operation (e.g., reading the medium may be hundreds of times faster than erasing, and tens of times faster than programming the medium). The memory medium may be partitioned into memory divisions that can be erased as a group (e.g., erase blocks) in order to, inter alia, account for the asymmetric properties of the medium. As such, modifying a single data segment in-place may require erasing the entire erase block comprising the data, and rewriting the modified data to the erase block, along with the original, unchanged data. This may result in inefficient "write amplification," which may excessively wear the medium. Therefore, in some embodiments, the non-volatile memory controller may be configured to write data out-of-place. As used herein, writing data "out-of-place" refers to writing data to different media storage location(s) rather than overwriting the data "in-place" (e.g., overwriting the original physical location of the data). Modifying data out-of-place may avoid write amplification, since existing, valid data on the erase block with the data to be modified need not be erased and recopied. Moreover, writing data out-of-place may remove erasure from the latency path of many storage operations (the erasure latency is no longer part of the critical path of a write operation).

The non-volatile memory controller may comprise one or more processes that operate outside of the regular path for servicing of storage operations (the "path" for performing a storage operation and/or servicing a storage request). As used herein, the "path for servicing a storage request" or "path for servicing a storage operation" (also referred to as the "critical path") refers to a series of processing operations needed to service the storage operation or request, such as a read, write, modify, or the like. The path for servicing a storage request may comprise receiving the request from a storage client, identifying the logical addresses of the request, performing one or more storage operations on non-volatile memory medium, and returning a result, such as acknowledgement or data. Processes that occur outside of the path for servicing storage requests may include, but are not limited to: a groomer, de-duplication, and so on. These processes may be implemented autonomously and in the background, so that they do not interfere with or impact the performance of other storage operations and/or requests. Accordingly, these processes may operate independent of servicing storage requests.

In some embodiments, the non-volatile memory controller comprises a groomer, which is configured to reclaim memory divisions (e.g., erase blocks) for reuse. The write out-of-place paradigm implemented by the non-volatile memory controller may result in obsolete or invalid data remaining on the non-volatile memory medium. For example, overwriting data X with data Y may result in storing Y on a new memory division (rather than overwriting X in place), and updating the any-to-any mappings of the metadata to identify Y as the valid, up-to-date version of the data. The obsolete version of the data X may be marked as invalid, but may not be immediately removed (e.g., erased), since, as discussed above, erasing X may involve erasing an entire memory division, which is a time-consuming operation and may result in write amplification. Similarly, data that is no longer is use (e.g., deleted or trimmed data) may not be immediately removed. The non-volatile memory medium may accumulate a significant amount of invalid data. A groomer process may operate outside of the critical path for servicing storage operations. The groomer process may reclaim memory divisions so that they can be reused for other storage operations. As used herein, reclaiming a memory division refers to erasing the memory division so that new data may be stored/programmed thereon. Reclaiming a memory division may comprise relocating valid data on the memory division to a new location. The groomer may identify memory divisions for reclamation based upon one or more factors, which may include, but are not limited to: the amount of invalid data in the memory division, the amount of valid data in the memory division, wear on the memory division (e.g., number of erase cycles), time since the memory division was programmed or refreshed, and so on.

The non-volatile memory controller may be further configured to store data in a log format. As described above, a log format refers to a data format that defines an ordered sequence of storage operations performed on a non-volatile memory medium (e.g., time sequence information). In some embodiments, the log format comprises storing data in a pre-determined sequence of media addresses of the non-volatile memory medium (e.g., within sequential pages and/or erase blocks of the medium). The log format may further comprise associating data (e.g., each packet or data segment) with respective sequence indicators (e.g., time sequence information). The sequence indicators or other time sequence information may be applied to data individually (e.g., applied to each data packet) and/or to data groupings (e.g., packets stored sequentially on a memory division, such as an erase block). In some embodiments, sequence indicators may be applied to memory divisions when the memory divisions are reclaimed (e.g., erased), as described above, and/or when the memory divisions are initialized or first used to store data.

In some embodiments the log format may comprise storing data in an "append only" paradigm. The non-volatile memory controller may maintain a current append point at a media address of the non-volatile memory device. The append point may be a current memory division and/or offset within a memory division. Data may then be sequentially appended from the append point. The sequential ordering of the data, therefore, may be determined based upon the sequence indicator or other time sequence information of the memory division of the data in combination with the sequence of the data within the memory division. Upon reaching the end of a memory division, the non-volatile memory controller may identify the "next" available memory division (the next memory division that is initialized and ready to store data). The groomer may reclaim memory divisions comprising invalid, stale, and/or deleted data, to ensure that data may continue to be appended to the media log.

The log format described herein may allow valid data to be distinguished from invalid data based upon the contents of the non-volatile memory medium, and independently of other metadata. As discussed above, invalid data may not be removed from the non-volatile memory medium until the memory division comprising the data is reclaimed. Therefore, multiple "versions" of data having the same context may exist on the non-volatile memory medium (e.g., multiple versions of data having the same logical addresses). The sequence indicators or other time sequence information associated with the data may be used to distinguish invalid versions of data from the current, up-to-date version of the data; the data that is the most recent in the log is the current version, and previous versions may be identified as invalid. In other embodiments, storage formats other than a log format may be used, with various types of non-volatile memory media, such as a write-in-place storage format, or the like.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description.

FIG. 1A depicts one embodiment of a system 100 comprising a data expiration module 150 for data expiry. The data expiration module 150 may be part of and/or in communication with a storage management layer (SML) 130, part of and/or in communication with a non-volatile memory controller 124, or the like for a non-volatile memory device 120. The SML 130 may operate on a non-volatile memory system 102 of a computing device 110, which may comprise a processor 111, volatile memory 112, and a communication interface 113. The processor 111 may comprise one or more central processing units, one or more general-purpose processors, one or more application-specific processors, one or more virtual processors (e.g., the computing device 110 may be a virtual machine operating within a host), one or more processor cores, or the like. The communication interface 113 may comprise one or more network interfaces configured to communicatively couple the computing device 110 (and/or non-volatile memory controller 124) to a communication network, such as an Internet Protocol network, a Storage Area Network, or the like.

The computing device 110 may further comprise a non-transitory, computer readable storage medium 114. The computer readable storage medium 114 may comprise executable instructions configured to cause the computing device 110 (e.g., processor 111) to perform steps of one or more of the methods disclosed herein. Alternatively, or in addition, the storage management layer 130 and/or one or more modules thereof may be embodied as one or more computer readable instructions stored on the non-transitory storage medium 114.

The storage management layer 130 may be configured to provide storage services to one or more storage clients 116. The storage clients 116 may include local storage clients 116 operating on the computing device 110 and/or remote, storage clients 116 accessible via the network (and network interface 113). The storage clients 116 may include, but are not limited to: operating systems, file systems, database applications, server applications, kernel-level processes, user-level processes, applications, and the like.

Figure 1B:
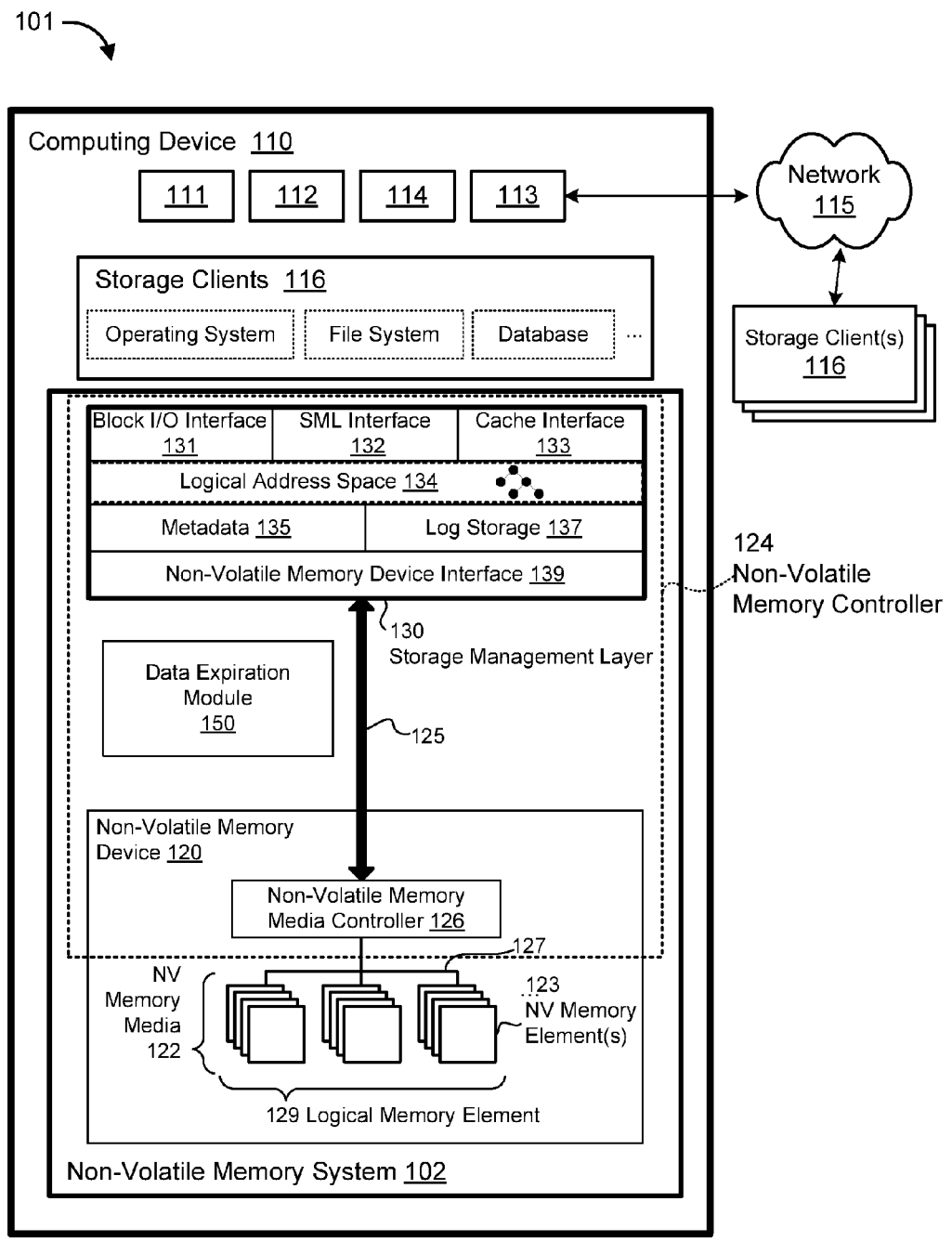
FIG. 1B is a schematic block diagram illustrating another embodiment of a system for data expiry.

The storage management layer 130 comprises and/or is communicatively coupled to one or more non-volatile memory devices 120A-N. The non-volatile memory devices 120A-N may include different types of non-volatile memory devices including, but not limited to: solid-state storage devices, hard drives, SAN storage resources, or the like. The non-volatile memory devices 120A-N may comprise respective non-volatile memory media controllers 126A-N and non-volatile memory media 122A-N. As illustrated in FIG. 1B, The SML 130 may provide access to the non-volatile memory devices 120A-N via a traditional block I/O interface 131. Additionally, the SML 130 may provide access to enhanced functionality (large, virtual address space) through the SML interface 132. The metadata 135 may be used to manage and/or track storage operations performed through any of the Block I/O interface 131, SML interface 132, cache interface 133, or other, related interfaces.

The cache interface 133 may expose cache-specific features accessible via the storage management layer 130. Also, in some embodiments, the SML interface 132 presented to the storage clients 116 provides access to data transformations implemented by the non-volatile memory devices 120A-N and/or the non-volatile memory media controllers 126A-N.

The SML 130 may provide storage services through one or more interfaces, which may include, but are not limited to: a block I/O interface, an extended storage management layer interface, a cache interface, and the like. The SML 130 may present a logical address space 134 to the storage clients 116 through one or more interfaces. As discussed above, the logical address space 134 may comprise a plurality of logical addresses, each corresponding to respective media locations on one or more of the non-volatile memory devices 120A-N. The SML 130 may maintain metadata 135 comprising any-to-any mappings between logical addresses and media locations, as described above.

The SML 130 may further comprise a log storage module 137 that is configured to store data in a contextual, log-based format. The contextual, log-based data format may comprise associating data with persistent contextual metadata, such as the logical address of the data, or the like. The contextual, log-based format may further comprise associating data with respective sequence identifiers on the non-volatile memory media 122A-N, which define an ordered sequence of storage operations performed on the non-volatile memory devices 120A-N, as described above.

The SML 130 may further comprise a non-volatile memory device interface 139 configured to transfer data, commands, and/or queries to the non-volatile memory devices 120A-N over a bus 125, which may include, but is not limited to: a peripheral component interconnect express (PCI Express or PCIe) bus, a serial Advanced Technology Attachment (ATA) bus, a parallel ATA bus, a small computer system interface (SCSI), FireWire, Fibre Channel, a Universal Serial Bus (USB), a PCIe Advanced Switching (PCIe-AS) bus, a network, Infiniband, SCSI RDMA, or the like. The non-volatile memory device interface 139 may communicate with the non-volatile memory devices 120A-N using input-output control (IO-CTL) command(s), IO-CTL command extension(s), remote direct memory access, or the like.

The non-volatile memory system 102, in the depicted embodiment, includes a data expiration module 150. The data expiration module 150, in one embodiment, is configured to expire, remove, delete, erase, trim, timeout, invalidate, or otherwise clear data from the non-volatile memory device 120 over time. Certain data, such as an event log, an electronic shopping cart, social media posts, real-time applications, or the like may lose relevance or importance over time. A client 116 may not desire to maintain such data after a predefined amount of time. The data expiration module 150 may provide an interface whereby clients 116 may define custom expiration periods for data stored in the non-volatile memory device 120.

The data expiration module 150, in certain embodiments, provides data expiry using the sequential nature of data in the non-volatile memory device 120 provided by the log storage module 137 and/or metadata stored with the data, so that the data expiration module 150 adds little or no additional overhead to the system 100. The data expiration module 150 may provide automated expiry at various granularities, such as at a global granularity for the entire non-volatile memory device 120, at a per input/output (I/O) granularity, and/or at a per container granularity (e.g., a logical block, a logical block range, a key-value pair, a data packet, a data object, a file, an error correcting code (ECC) block or chunk or codeword, a physical page, a logical page, a physical erase block, a logical erase block, a virtual storage unit (VSU), or the like).

The data expiration module 150, in certain embodiments, may allow a client 116 to define or set a custom expiration period, timeout period, time-to-live (TTL), or the like for data of the non-volatile memory device 120, so that the data expiration module 150 may expire different data of the non-volatile memory device 120 at different granularities. The data expiration module 150 may use metadata that the SML 130 and/or the non-volatile memory controller 124 stores in the non-volatile memory device 120 to determine when to expire data.

By providing automated data expiry, the data expiration module 150 may reduce I/O for the non-volatile memory device 120, as clients 116 may utilize the automated data expiry rather than tracking and checking data expiry themselves. In embodiments where the data expiration module 150 expires key-value pairs or other containers, the data expiration module 150 may reduce a probability of a collision by expiring older key-value pairs, thereby reducing the number of keys in use and increasing the number of available keys.

The data expiration module 150 may also reduce write amplification within the non-volatile memory device 120 by expiring data rather than copying or moving the data to a new location as part of a storage capacity recovery operation or the like. Write amplification is the rewriting or moving of data during a storage capacity recovery or garbage collection process, causing the same data originally written in response to a storage request to be written more than once.

The data expiration module 150, in certain embodiments, may reduce a recovery time or rebuild time after a restart event for the non-volatile memory device 120, as expired data may be ignored and/or expired during recovery instead of including the expired data in a logical-to-physical mapping structure or other metadata 135. The data expiration module 150, in a further embodiment, may reduce a memory footprint of the SML 130, as metadata 135 is no longer required for expired data. In this manner, by providing automated data expiration, the data expiration module 150 may allow the non-volatile memory device 120 and/or the system 100 to operate more efficiently by reducing I/O, reducing the probability of collisions, reducing write amplification, reducing a crash recovery time, reducing memory consumption, or the like.

In one embodiment, the data expiration module 150 may comprise executable software code, such as a device driver, SML 130, or the like, stored on the computer readable storage medium 114 for execution on the processor 111. In another embodiment the data expiration module 150 may comprise logic hardware of one or more of the non-volatile memory devices 120A-N, such as a non-volatile memory media controller 126A-N, a non-volatile memory controller 124, a device controller, a field-programmable gate array (FPGA) or other programmable logic, firmware for an FPGA or other programmable logic, microcode for execution on a microcontroller, an application-specific integrated circuit (ASIC), or the like. In a further embodiment, the data expiration module 150 may include a combination of both executable software code and logic hardware.

In one embodiment, the data expiration module 150 is configured to receive storage requests from the SML 130 via a bus 125 or the like. The data expiration module 150 may be further configured to transfer data to/from the SML 130 and/or storage clients 116 via the bus 125. Accordingly, the data expiration module 150, in some embodiments, may comprise and/or be in communication with one or more direct memory access (DMA) modules, remote DMA modules, bus controllers, bridges, buffers, and so on to facilitate the transfer of storage requests and associated data. In another embodiment, the data expiration module 150 may receive storage requests as an API call from a storage client 116, as an IO-CTL command, or the like. The data expiration module 150 is described in greater detail below with regard to FIGS. 2 and 3.

FIG. 1B depicts another embodiment of a system 101 comprising a data expiration module 150. As described above, the data expiration module 150 may be part of and/or in communication with a storage management layer 130 and/or a non-volatile memory controller 124. The SML 130 may operate on a non-volatile memory system 102 of a computing device 110, which, as discussed above, may comprise a processor 111, volatile memory 112, communication interface 113, and non-transitory, computer readable storage medium 114. The communication interface 113 may comprise one or more network interfaces configured to communicatively couple the computing device 110 (and/or non-volatile memory controller 124) to a network 115 and/or to one or more remote, network-accessible storage clients 116.

The computing device 110 may comprise a non-volatile memory controller 124 that is configured to provide storage services to the storage clients 116. The storage clients 116 may include local storage clients 116 operating on the computing device 110 and/or remote, storage clients 116 accessible via the network 115 (and network interface 113). The non-volatile memory controller 124 comprises one or more non-volatile memory devices 120. Although FIG. 1B depicts a single non-volatile memory device 120, the disclosure is not limited in this regard and could be adapted to incorporate any number of non-volatile memory devices 120.

The non-volatile memory device 120 may comprise one or more non-volatile memory media 122, which may include but is not limited to: NAND flash memory, NOR flash memory, nano random access memory (nano RAM or NRAM), nanocrystal wire-based memory, silicon-oxide based sub-10 nanometer process memory, graphene memory, Silicon-Oxide-Nitride-Oxide-Silicon (SONOS), resistive RAM (RRAM), programmable metallization cell (PMC), conductive-bridging RAM (CBRAM), magneto-resistive RAM (MRAM), dynamic RAM (DRAM), phase change RAM (PRAM or PCM), a magnetic storage medium (e.g., hard disk, tape), an optical storage medium, or the like. While the non-volatile memory medium 122 is referred to herein as a "memory medium," in various embodiments, the non-volatile memory medium 122 may more generally comprise a non-volatile recording medium capable of recording data, which may be referred to as a non-volatile memory medium, a non-volatile storage medium, or the like. Further, the non-volatile memory device 120, in various embodiments, may comprise a non-volatile recording device, a non-volatile memory device, a non-volatile storage device, or the like.

The non-volatile memory medium 122 may comprise one or more non-volatile memory elements 123, which may include, but are not limited to: chips, packages, planes, die, and the like. A non-volatile memory media controller 126 may be configured to manage storage operations on the non-volatile memory medium 122, and may comprise one or more processors, programmable processors (e.g., field-programmable gate arrays), or the like. In some embodiments, the non-volatile memory media controller 126 is configured to store data on (and read data from) the non-volatile memory medium 122 in the contextual, log format described above, and to transfer data to/from the non-volatile memory device 120, and so on.

The non-volatile memory media controller 126 may be communicatively coupled to the non-volatile memory medium 122 by way of a bus 127. The bus 127 may comprise an I/O bus for communicating data to/from the non-volatile memory elements 123. The bus 127 may further comprise a control bus for communicating addressing and other command and control information to the non-volatile memory elements 123. In some embodiments, the bus 127 may communicatively couple the non-volatile memory elements 123 to the non-volatile memory media controller 126 in parallel. This parallel access may allow the non-volatile memory elements 123 to be managed as a group, forming a logical memory element 129. As discussed above, the logical memory element may be partitioned into respective logical memory units (e.g., logical pages) and/or logical memory divisions (e.g., logical erase blocks). The logical memory units may be formed by logically combining physical memory units of each of the non-volatile memory elements. For example, if the non-volatile memory medium 122 comprises twenty-five (25) non-volatile memory elements, each logical memory unit may comprise twenty-five (25) pages (a page of each element of non-volatile memory medium 122).

The non-volatile memory controller 124 may comprise a SML 130 and the non-volatile memory media controller 126. The SML 130 may provide storage services to the storage clients 116 via one or more interfaces 131, 132, and/or 133. In some embodiments, the SML 130 provides a block-device I/O interface 131 through which storage clients 116 perform block-level I/O operations. Alternatively, or in addition, the SML 130 may provide a storage management layer (SML) interface 132, which may provide other storage services to the storage clients 116. In some embodiments, the SML interface 132 may comprise extensions to the block device interface 131 (e.g., storage clients 116 may access the SML interface 132 through extensions to the block device interface 131). Alternatively, or in addition, the SML interface 132 may be provided as a separate API, service, and/or library. The SML 130 may be further configured to provide a cache interface 133 for caching data using the non-volatile memory system 102.

As described above, the SML 130 may present a logical address space 134 to the storage clients 116 (through the interfaces 131, 132, and/or 133). The SML 130 may maintain metadata 135 comprising any-to-any mappings between logical addresses in the logical address space 134 and media locations on the non-volatile memory device 120. The metadata 135 may comprise a logical-to-physical mapping structure with entries that map logical addresses in the logical address space 134 and media locations on the non-volatile memory device 120. The logical-to-physical mapping structure of the metadata 135, in one embodiment, is sparsely populated, with entries for logical addresses for which the non-volatile memory device 120 stores data and with no entries for logical addresses for which the non-volatile memory device 120 does not currently store data. The metadata 135, in certain embodiments, tracks data at a block level, with the SML 130 managing data as blocks.

The non-volatile memory system 102 may further comprise a log storage module 137, which, as described above, may be configured to store data on the non-volatile memory device 120 in a contextual, log format. The contextual, log data format may comprise associating data with a logical address on the non-volatile memory medium 122. The contextual, log format may further comprise associating data with respective sequence identifiers or other time sequence information on the non-volatile memory medium 122, which define an ordered sequence of storage operations performed on the non-volatile memory medium 122, as described above. The non-volatile memory controller 124 may further comprise a non-volatile memory device interface 139 that is configured to transfer data, commands, and/or queries to the non-volatile memory media controller 126 over a bus 125, as described above.

Figure 2:
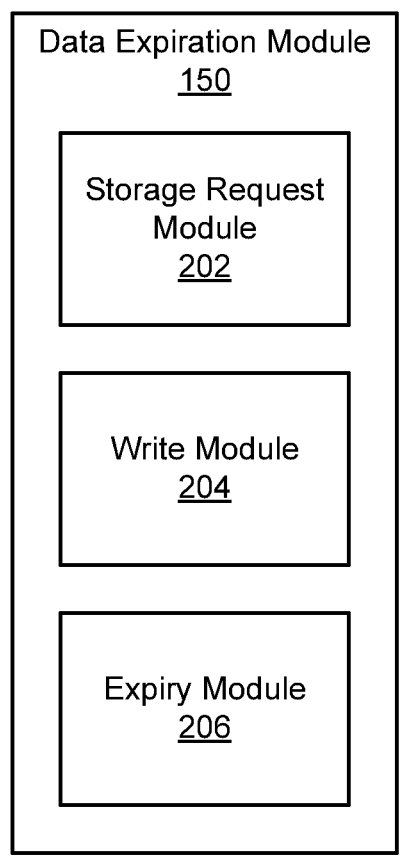
FIG. 2 is a schematic block diagram illustrating one embodiment of a data expiration module.

FIG. 2 depicts one embodiment of a data expiration module 150. The data expiration module 150 of FIG. 2, in certain embodiments, may be substantially similar to the data expiration module 150 described above with regard to FIG. 1A and/or FIG. 1B. In the depicted embodiment, the data expiration module 150 includes a storage request module 202, a write module 204, and an expiry module 206.

In one embodiment, the storage request module 202 is configured to monitor, receive, or otherwise detect storage requests and/or I/O requests for the non-volatile memory device 120, such as read requests, write requests, erase requests, TRIM requests, and/or other types of storage requests. The storage request module 202 may detect a storage request by receiving the storage request directly, detecting a storage request sent to a different module or entity, such as detecting a storage request sent directly to the non-volatile memory device 120, or the like. In one embodiment, the host computing device 110 sends storage requests, directly or indirectly, to the storage request module 202.

A storage request, in one embodiment, may be for data that is not currently stored in the non-volatile memory device 120. Data that is not stored on the non-volatile memory device 120, in various embodiments, may include new data not yet stored on the non-volatile memory device 120, modifications to data that is stored on the non-volatile memory device 120, data that is stored on a backing store but not currently cached in the non-volatile memory device 120, or the like. A storage request, in various embodiments, may directly include data, may include a reference, a pointer, or an address for data, or the like. For example, in one embodiment, a storage request (such as a write request or the like) may include a range of logical addresses indicating data to be stored on the non-volatile memory device 120 by way of a Direct Memory Access (DMA) operation, Remote DMA (RDMA) operation, or the like.

In a further embodiment, a single storage request may include several different contiguous and/or noncontiguous ranges of logical addresses or logical blocks. In a further embodiment, a storage request may include one or more destination addresses for data, such as logical and/or physical addresses for the data on the non-volatile memory device 120. The storage request module 202 and/or another cooperating module, in various embodiments, may retrieve the data of a storage request directly from a storage request itself, from a location referenced by a storage request (e.g., from a location in system memory 112 or other data storage referenced in a DMA or RDMA request), or the like.

In one embodiment, a storage request such as a write request or the like may include an expiration indicator for data of the storage request. For example, the storage request module 202 may provide a custom, modified, and/or updated interface to clients 116 with a parameter or field for clients 116 to specify an expiration indicator. An expiration indicator or parameter, as used herein, defines or identifies an expiration period, timeout period, time-to-live (TTL), or the like for data, after which the non-volatile memory device 120 is no longer obligated and/or required to store or persist the data (e.g., after which the expiry module 206 may expire the data).

An expiration period and associated expiration indicator or parameter, in one embodiment, may be global for the non-volatile memory device 120 (e.g., for all or substantially all workload data of the non-volatile memory device 120). In another embodiment, an expiration period and associated expiration indicator or parameter may be fine-grained or individual to a container or data set of the non-volatile memory device 120, such as a logical block, a logical block range, a key-value pair, a data packet, a data object, a file, an ECC block or chunk or codeword, a physical page, a logical page, a physical erase block, a logical erase block, a VSU, or the like. For example, in certain embodiments, clients 116 may specify expiration periods on a per I/O basis, using expiration indicators or parameters in write requests or the like.

An expiration indicator, parameter, and/or period, in one embodiment, may comprise a relative value representing a span or period of time, such as a number of seconds, minutes, hours, days, weeks, months, years or the like before the expiry module 206 may expire the data (e.g., 45 seconds; 18 minutes; 13 hours; 10 days; 4 years), which may be determined relative to a reference time such as a time the storage request module 202 received a write request, a time the write module 204 wrote the data, or the like. Other embodiments of a relative expiration indicator, parameter, and/or period may include a number of reads for data before the expiry module 206 may expire the data, a program/erase count for the non-volatile memory medium 122 or a portion thereof before the expiry module 206 may expire the data, or another relative indicator of time. In another embodiment, an expiration indicator, parameter, and/or period may comprise an actual, absolute, or fixed time in the future, such as a date and/or time after which the data may be expired (e.g., August 12th; 12:05 p.m.; Thursday; 2016; 05-30-2021; a next scheduled maintenance date).

While in certain embodiments, the storage request module 202 may receive an expiration indicator or parameter in a write request, in other embodiments, the data expiration module 150 may provide an expiry interface such as an API, function call, shared library, or the like allowing clients 116 to set or define expiration indicators, parameters, and/or periods using a custom data expiry command. In a further embodiment, the data expiration module 150 may use a default or predefined expiration indicator, parameter, period, or the like.

In one embodiment, the storage request module 202 may receive read requests from clients 116 identifying data stored in the non-volatile memory device 120. The expiry module 206, as described below, in certain embodiments, may opportunistically determine whether to expire data in response to a read request for the data, expiring the identified data if an expiration period for the data is satisfied. In another embodiment, the storage request module 202 may receive key-value store commands from one or more clients 116 over a key-value store interface or the like. A key-value store command, in certain embodiments, may include an expiration indicator or parameter for one or more key-value pairs identified by the key-value store command. In a further embodiment, the storage request module 202 may execute, satisfy, and/or service a received storage request or command, return requested data and/or an acknowledgment to a requesting client 116, or the like.

In one embodiment, the write module 204 is configured to store data of a write request from the storage request module 202 with expiry metadata for the data in the non-volatile memory medium 122 of the non-volatile memory device 120. As described in greater detail below with regard to the metadata module 302, in certain embodiments, the write module 204 may store expiry metadata that is based on an expiration period, parameter, or indicator for the associated data. In a further embodiment, the write module 204 may store expiry metadata indicating or preserving a sequential or temporal order for the associated data (e.g., an order in which the data was received, an order in which the data was written, or the like). Expiry metadata, as used herein, comprises a direct or indirect indication of a time after which associated data may be expired, erased, removed, deleted, trimmed, invalidated, evicted, or otherwise cleared from the non-volatile memory device 120. In certain embodiments, expiry metadata may comprise a logical identifier for data, such as an LBA or other logical address, and the write module 204, in cooperation with the metadata module 302 or the like, may store a logical identifier with other expiry metadata in the non-volatile memory medium 122.

The write module 204, in one embodiment, writes data of a write request to the non-volatile memory device 120 by appending the data to a sequential, log-based writing structure preserved in the non-volatile memory medium 122 of the non-volatile memory device 120 at an append point. The write module 204, in one embodiment, returns one or more physical addresses corresponding to a location of the append point at which the data was appended to the SML 130 and/or the log storage module 137, which may map the one or more logical addresses of the non-volatile memory device 120 to the one or more physical addresses corresponding to the append point in the metadata 135 or other logical-to-physical mapping structure. In one embodiment, if data corresponding to one or more logical addresses of the write request is already stored in the non-volatile memory device 120, the write module 204 invalidates the existing data in the non-volatile memory device 120.

By writing data and expiry metadata for the data sequentially to a log-based writing structure, the write module 204, in certain embodiments, enables asynchronous, opportunistic, or lazy expiry of data, as storage regions (e.g., logical or physical erase blocks) of the sequential, log-based writing structure are processed for storage capacity recovery, as read requests arrive for the data, in response to a background scan of the non-volatile memory medium 122, during a recovery scan after a restart event, or the like.

The write module 204, in certain embodiments, may store metadata in a plurality of locations which may be used in combination as expiry metadata. For example, in one embodiment, the write module 204 may store metadata (e.g., time sequence information) in an erase block opener of a logical or physical erase block of the non-volatile memory medium 122 at initialization (e.g., selected for use, added to a sequential, log-based writing structure, or the like) of the erase block prior to storing workload data in the erase block. The metadata in the erase block opener may comprise time sequence information indicating a time that or order in which the erase block was initialized, such as a timestamp, a sequence number, or the like.

As the write module 204 writes data to the erase block after initialization, the write module 204 may store additional metadata with the data, such as an expiration indicator or parameter for each key-value pair, data packet, data object, file, ECC block or chunk or codeword, physical page, logical page, or the like written to the erase block. In certain embodiments, the expiry module 206 may combine relative metadata (e.g., an expiration period or other expiration indicator or parameter for data within an erase block) with absolute metadata (e.g., a timestamp from an erase block opener) to determine an expiration time for data, and compare the expiration time to the current time to determine whether an expiration indicator or parameter has been satisfied.

In embodiments where the write module 204 uses relative expiry metadata, the write module 204 and/or the storage capacity recovery module 310 may update the relative expiry metadata (e.g., an expiration indicator, parameter, and/or period) if the associated data is moved or copied to a different location within the non-volatile memory medium 122, as described below with regard to the storage capacity recovery module 310, so that the relative expiry metadata will remain accurate relative to absolute metadata (e.g., a new timestamp in the erase block opener of the new location) after the data is moved. In a further embodiment, the metadata may include one or more epoch identifiers associated with different temporal ranges of data, so that a temporal order of data in the sequential, log-based writing structure is preserved even across storage capacity recovery events, as described below with regard to FIGS. 4A and 4B.

As used herein, a temporal range or epoch of data comprises data received and/or written within the same time period or sequential range of time. An epoch identifier or other time sequence indicator, as described below, may include an indicator, marker, label, flag, field, packet, or other data structure identifying or preserving a temporal and/or sequential order for data, in a sequential, log-based writing structure or the like. For example, an epoch identifier may mark a temporal range or epoch of data, may indicate a time at which data was received and/or written, or the like. An epoch identifier may be absolute (e.g., a timestamp), relative (e.g., a sequence number), or may otherwise indicate a temporal and/or sequential order for data.

In a further embodiment, the write module 204 may write expiry metadata comprising an absolute expiration time to the non-volatile memory device 120 with associated data. An absolute expiration time may include a date and/or time, a timestamp, or the like. For example, instead of or in addition to storing an expiration indicator or parameter as relative expiry metadata, the write module 204 may use the expiration indicator or parameter and a time at which the data is received and/or written to determine an absolute expiration time for the data, and may write the absolute expiration time to the non-volatile memory device 120 with associated data. In embodiments where the write module 204 uses absolute expiry metadata, the absolute expiry metadata may remain accurate even if the data is moved or copied to a different location within the non-volatile memory medium 122, as described below with regard to the storage capacity recovery module 310.

In one embodiment, the expiry module 206 is configured to expire, erase, remove, delete, trim, invalidate, evict, or otherwise clear data from the non-volatile memory medium 122 of the non-volatile memory device 120 in response to an expiration period, timeout period, expiration indicator or parameter, or the like for the data being satisfied. In certain embodiments, the expiry module 206 may expire, erase, remove, delete, trim, invalidate, evict, or otherwise clear data from the non-volatile memory medium 122 by performing an erase procedure or operation on the portion of the non-volatile memory medium 122 storing the expired data, so that the non-volatile memory medium no longer stores the expired data. In a further embodiment, the expiry module 206 may expire, erase, remove, delete, trim, invalidate, evict, or otherwise clear data from the non-volatile memory medium 122 by blocking or preventing access to the data by clients 116, while the data remains stored in the non-volatile memory medium 122, at least temporarily. In one embodiment, as described below, the expiry module 206 may expire, erase, remove, delete, trim, invalidate, evict, or otherwise clear data from the non-volatile memory medium 122 by marking the data as invalid, marking the data for expiration, or the like, such that another process or module (e.g., the storage capacity recovery module 310 or the like) may subsequently perform an erase procedure or operation for the data.

The expiry module 206, in certain embodiments, expires data based on metadata that the write module 204 stores with the data in the non-volatile memory device 120. In one embodiment, an expiration period, timeout period, expiration indicator or parameter, or the like is satisfied when at least an amount of time and/or absolute time indicated by the expiration period, timeout period, expiration indicator or parameter, or the like has passed.

How the expiry module 206 determines whether an expiration period, timeout period, expiration indicator or parameter, or the like has been satisfied, in certain embodiments, may depend on the type of metadata used by the write module 204. In one embodiment, where the metadata includes an absolute expiration time, the expiry module 206 may compare the absolute expiration time to the current time, and if the current time is later than the absolute expiration time, then the associated expiration period, timeout period, expiration indicator or parameter, or the like has been satisfied. In another embodiment, where the metadata includes relative expiry metadata such as an expiration period or timeout period, the expiry module 206 may add the relative expiry metadata to absolute metadata, such as a timestamp or other time sequence information from an erase block opener or the like, and compare the result to the current time. If the current time is later than the result, then the associated expiration period, timeout period, expiration indicator or parameter, or the like has been satisfied.

The expiry module 206, in certain embodiments, may check for expired data asynchronously, opportunistically, or lazily, and may not necessarily expire data immediately upon the associated expiration period, timeout period, or expiration indicator or parameter being satisfied. In one embodiment, the expiry module 206 may periodically identify data stored in the non-volatile memory medium 122, examine metadata associated with the data, and determine whether an expiration period, timeout period, expiration indicator or parameter, or the like for the data has been satisfied. For example, in certain embodiments, the expiry module 206 may cooperate with the storage capacity recovery module 310 to identify a selected storage region (e.g., logical or physical erase block) for a storage capacity recovery operation, and to expire any data from the selected storage region for which an expiration period, timeout period, expiration indicator or parameter, or the like has been satisfied, by performing a pre-groom scan of the storage region as described below with regard to the storage capacity recovery module 310.

The expiry module 206, in one embodiment, may expire data by marking the data as invalid such that the storage capacity recovery module 310 erases the expired data from the selected storage region during a storage capacity recovery operation. In this manner, the storage capacity recovery module 310 may recover storage capacity of the expired data without moving, copying, or otherwise writing the data to another location in the non-volatile memory medium 122 (e.g., writing the data forward to an append point of the sequential, log-based writing structure or the like), thereby reducing write amplification and increasing available storage capacity.

In another embodiment, the expiry module 206 may check for expired data asynchronously, opportunistically, or lazily in response to a read request for the data. In response to the storage request module 202 receiving a read request identifying data, the expiry module 206, in one embodiment, may examine metadata for the identified data, and expire the data in response to the metadata indicating that an expiration period, timeout period, expiration indicator or parameter, or the like has been satisfied, each in response to the read request.

In embodiments where multiple expiration periods, timeout periods, and/or expiration indicators or parameters apply to the same data (e.g., a global expiration period and a fine-grained per I/O or per container expiration period), in certain embodiments, the expiry module 206 may use or enforce whichever expiration period for the data is shortest. Using multiple expiration periods is described below with regard to the expiry module 206 of FIG. 3. The expiry module 206, in various embodiments, may expire various granularities or sizes of data, such as a logical block, a logical block range, a key-value pair, a data packet, a data object, a file, an ECC block or chunk or codeword, a physical page, a logical page, a physical erase block, a logical erase block, or the like.

Figure 3:
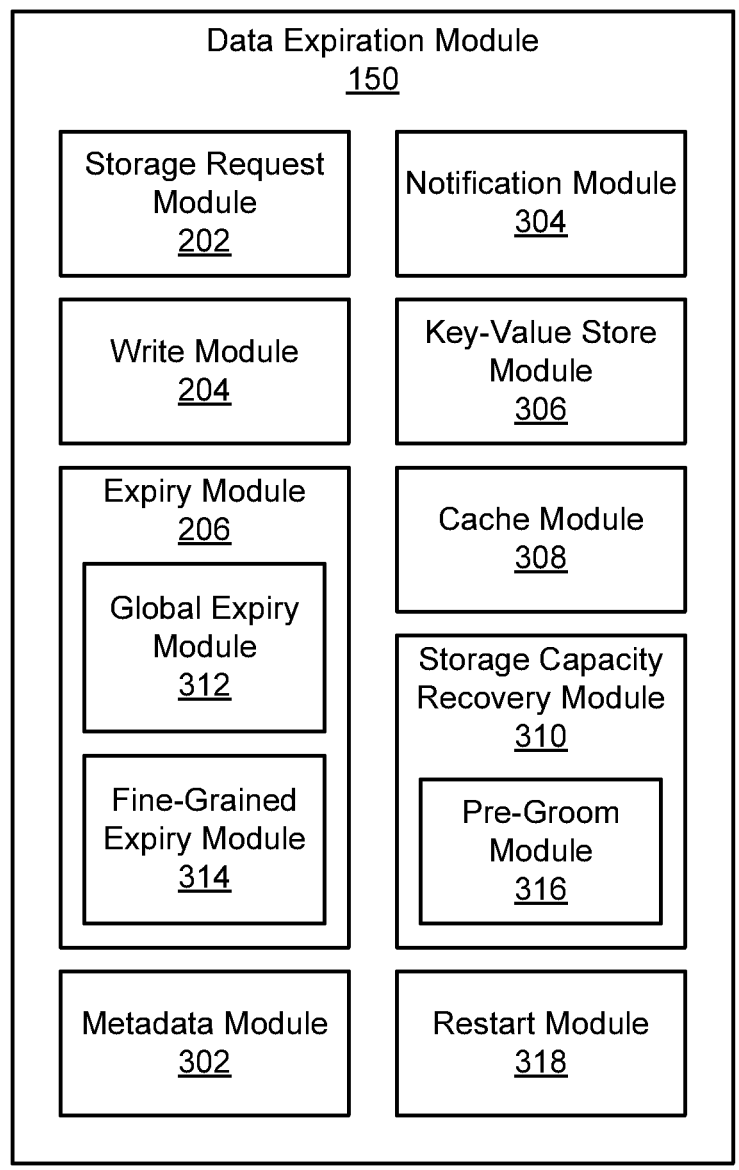
FIG. 3 is a schematic block diagram illustrating another embodiment of a data expiration module.

FIG. 3 depicts another embodiment of a data expiration module 150. The data expiration module 150 of FIG. 3, in certain embodiments, may be substantially similar to the data expiration module 150 described above with regard to FIG. 1A, FIG. 1B, and/or FIG. 2. In the depicted embodiment, the data expiration module 150 includes the storage request module 202, the write module 204, and the expiry module 206 and further includes a metadata module 302, a notification module 304, a key-value store module 306, a cache module 308, a storage capacity recovery module 310, and a restart module 318. The expiry module 206, in the depicted embodiment, includes a global expiry module 312 and a fine-grained expiry module 314. The storage capacity recovery module 310, in the depicted embodiment, includes a pre-groom module 316.

In one embodiment, the expiry module 206 uses the global expiry module 312 and expires all data (or all data marked as expirable) using the same expiration period, timeout period, and/or expiration indicator or parameter, so that data is expired after being stored substantially the same amount of time in the non-volatile memory device 120. In another embodiment, the expiry module 206 uses the fine-grained expiry module 314 and expires data using expiration periods, timeout periods, and/or expiration indicators or parameters that are selectable per I/O and/or per container.

A container may be a data structure or storage region associated with a data set, such as a logical block, a logical block range, a key-value pair, a data packet, a data object, a file, an ECC block or chunk or codeword, a physical page, a logical page, a physical erase block, a logical erase block, a virtual storage unit, or the like.

In a further embodiment, the expiry module 206 may use both the global expiry module 312 and the fine-grained expiry module 314, and both a global expiration period and an individual per I/O or per container expiration period may apply to the same data. In certain embodiments, whether the expiry module 206 uses a global expiration period or an individual per I/O or per container expiration period may be selectable by a user or other client 116. In another embodiment, the expiry module 206 may select and use a shortest of a global expiration period and an individual per I/O or per container expiration period for data.

In one embodiment, the metadata module 302 cooperates with the write module 204, as described above, to determine expiry metadata for and associate expiry metadata with data of the non-volatile memory device 120. The metadata module 302, in various embodiments, may associate an expiration period, a timeout period, an expiration indicator or parameter, time sequence information such as a timestamp or sequence number, or other metadata, such as a logical identifier or the like, with a data set and/or data container for the non-volatile memory device 120. The metadata module 302 may associate metadata with a data set and/or data container by cooperating with the write module 204 to store the metadata with the data set and/or data container, in a header, footer, opener, or other predefined location with regard to the data set and/or data container.

The metadata module 302 may determine expiry metadata, such as an expiration period, a timeout period, an expiration indicator or parameter, or time sequence information (e.g., a timestamp, a sequence number, and/or an epoch identifier), for data based on global or default settings (e.g., in cooperation with the global expiry module 312), based on an expiration indicator or parameter from a write request for the data (e.g., in cooperation with the fine-grained expiry module 314), based on a time at which a write request for data was received and/or the data was written to the non-volatile memory device 120 (e.g., time sequence information such as a timestamp, sequence number, or epoch identifier), or the like.

In one embodiment, the notification module 304 is configured to notify an owner of data, such as a user or other client 116, in response to the expiry module 206 expiring or otherwise clearing the data from the non-volatile memory medium 122 of the non-volatile memory device 120. The notification module 304, in one embodiment, may notify an owner that data is going to be expired prior to the expiry module 206 expiring the data. An owner, such as a user or other client 116, in certain embodiments, may confirm or deny expiration of data in response to a notification from the notification module 304 prior to the expiration. In another embodiment, the notification module 304 may notify an owner of data that the data has been expired after the expiry module 206 has expired the data.

The notification module 304, in certain embodiments, returns or otherwise sends data of a notification (e.g., data that has been or is going to be expired) to the owner of the data with the notification, in response to the expiry module 206 expiring or otherwise clearing the data from the non-volatile memory medium 122 of the non-volatile memory device 120. The owner of the data, such as a user or other client 116, may choose to discard the data, to re-store the data in the non-volatile memory device 120, to expire or otherwise clear corresponding data from a backing store or mirrored location, or the like.

In one embodiment, the key-value store module 306 is configured to maintain one or more key-value stores in the non-volatile memory device 120 that associate data values with unique keys, and provides the data values to the clients 116 in exchange for the corresponding keys. The key-value store module 306 persists data values on the non-volatile memory medium 122 of the non-volatile memory device 120. The data values, in certain embodiments, may have variable lengths.

In one embodiment, the key-value store module 306 stores data values in a restricted set of logical block addresses of the non-volatile memory device 120, so that the data values are only available to clients 116 through the key-value store module 306. As used herein, a restricted set of logical block addresses is a set of logical block addresses that are unavailable to clients 116 using a block device interface and/or are exclusively available to clients 116 using a key-value store interface. The restricted set of logical block addresses may be unavailable and substantially invisible to clients 116 using a block device interface to access the non-volatile memory device 120. In embodiments where the non-volatile memory device 120 stores workload or user data received over a block device interface and data values of a key-value store, the key-value store module 306 may store data values of the key-value store on the non-volatile memory medium 122 together with the workload or user data, so that the key-value store data values receive the same data protection features as the workload data. In this manner, the data values of the key-value store may be logically separated from workload data, but physically intermingled with workload data on the non-volatile memory medium 122.

In one embodiment, the logical address space of the non-volatile memory device 120 or of an individual VSU of the non-volatile memory device 120 is a sparse address space that is either as large as, or is larger than, the physical storage capacity of the non-volatile memory device 120. VSUs are described in greater detail below with regard to FIG. 5. A sparse logical address space, in certain embodiments, allows the non-volatile memory device 120 to use a single logical address space for keys and for the associated data values.

For example, the key-value store module 306 may divide a logical address space into a key portion and a data value portion to share a single logical address space between keys and data values. In another embodiment, the key-value store module 306 may divide individual logical addresses into a key address portion and a value address portion, logically segmenting the logical address space into contiguous ranges for each data value. In one embodiment, using a single logical address space, a single mapping structure, or the like for mapping keys to data values and for mapping logical addresses to physical locations on the non-volatile memory medium 122 eliminates the need for a separate key-value map, key-value index, key-value tags, or the like, for which look-up time overhead would otherwise increase access times of the non-volatile memory device 120 by requiring look-ups in multiple maps or indexes.

A sparse logical address space, in certain embodiments, may be thinly provisioned. For example, the storage capacity of the non-volatile memory medium 122 may be smaller than a size of the sparse logical address space of the non-volatile memory device 120 and the non-volatile memory controller 124 may allocate storage capacity of the non-volatile memory medium 122 and map logical addresses to the allocated storage capacity as the logical addresses are used. Dynamically mapping and allocating physical storage capacity of the non-volatile memory medium 122 on demand using a thinly provisioned, sparse logical address space, in one embodiment, provides an efficient use of the non-volatile memory medium 122, using physical capacity as it is requested.

Figure 4A:
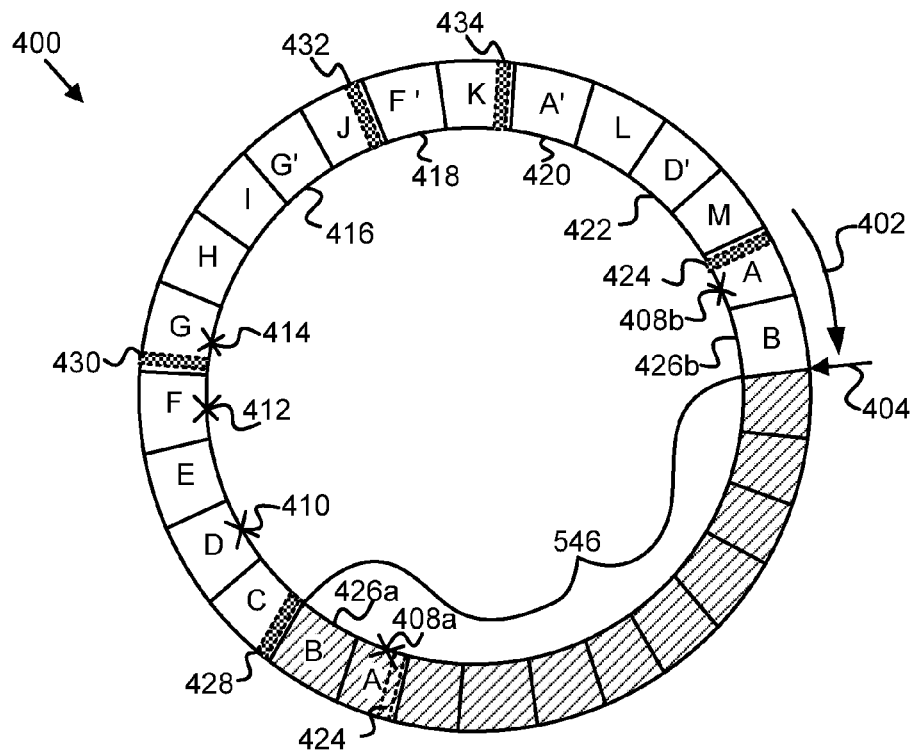
FIG. 4A is a schematic block diagram illustrating one embodiment of an epoch identifier.
Figure 4B:
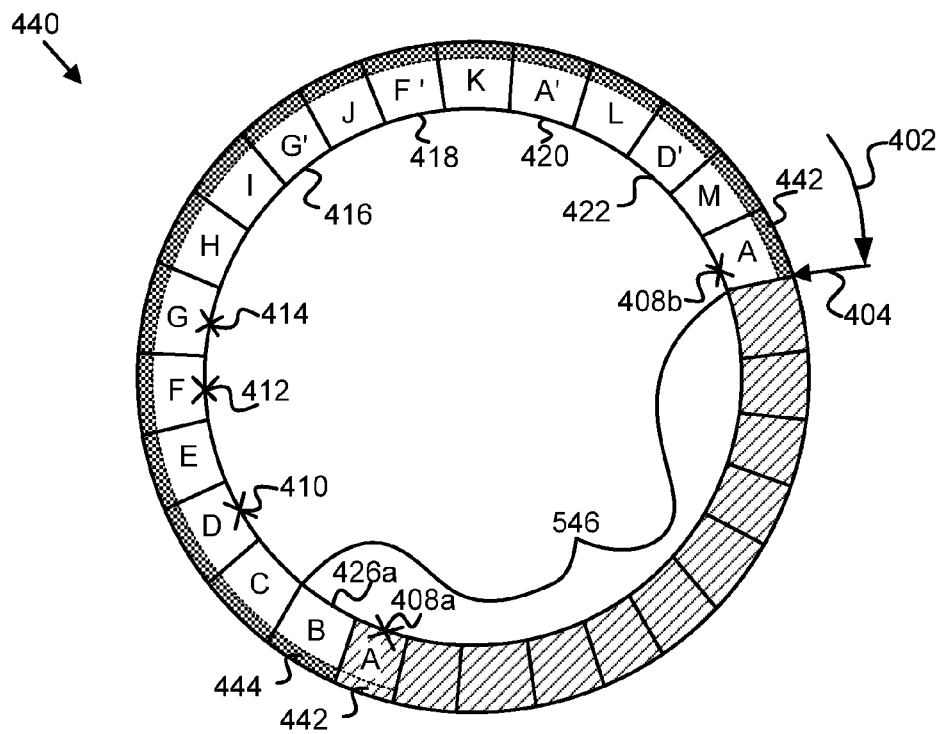
FIG. 4B is a schematic block diagram illustrating another embodiment of an epoch identifier.

As the expiry module 206 clears, trims, replaces, deletes, expires, and/or evicts data from the non-volatile memory device 120, the physical addresses and associated physical storage media of the non-volatile memory medium 122 in the depicted embodiment, are freed to store data for other logical addresses. In one embodiment, the non-volatile memory controller 124 stores the data (such as data values of a key-value store) at physical addresses using a log-based, append-only writing structure such that data cleared from the non-volatile memory device 120 or overwritten by a subsequent write request invalidates other data in the log, as described above. Consequently, the storage capacity recovery module 310 or other garbage collection process recovers the physical capacity of the invalid data in the log. One embodiment of the log-based, append only writing structure is a logically ring-like, cyclic data structure, as new data is appended to the log-based writing structure, previously used physical capacity is reused in a circular, theoretically infinite manner, as depicted in FIGS. 4A and 4B.

The key-value store module 306, in one embodiment, stores a data value to the non-volatile memory device 120, in response to a PUT command or the like for an associated key, using an ATOMIC WRITE operation to guarantee the atomicity of the data value, updates to the data value, and the like. An ATOMIC WRITE operation, in certain embodiments, provides variable size writes to accommodate variable sized data values. The key-value store module 306, in a further embodiment, in response to a GET command or the like for an associated key, uses an EXISTS operation to determine whether the non-volatile memory medium 122 stores a data value for the key. For example, in one embodiment, membership in a logical-to-physical address mapping structure for the non-volatile memory device 120 denotes storage, or existence, in the non-volatile memory medium 122 and an EXISTS operation queries the logical-to-physical address mapping structure to ascertain existence or storage of a data value.

In response to a DELETE command or the like for a key, in one embodiment, the key-value store module 306 uses a persistent TRIM ("PTRIM") operation to delete, erase, remove, or otherwise clear the associated data value from the non-volatile memory medium 122. A PTRIM operation, in certain embodiments, operates atomically to clear data values from the non-volatile memory medium 122 to free the associated physical capacity of the non-volatile memory medium 122 for storing other data and to free the LBA associated with the cleared data values for association with other data. ATOMIC WRITE, EXISTS, and PTRIM operations, in certain embodiments, are primitive operations that the non-volatile memory controller 124 provides to the key-value store module 306, allowing the key-value store module 306 to store and retrieve variable sized data values efficiently without wasting physical storage capacity of the non-volatile memory medium 122.

As described above, in certain embodiments, the expiry module 206 expires one or more key-value pairs, using a global expiration period for a key-value store and/or using individual expiration periods for key-value pairs. Each key-value pair may comprise a key encoded into a portion of a logical address within a sparse logical address space for the non-volatile recording medium 122. The logical address for a key-value pair may be mapped to a location for the key-value pair in the non-volatile recording medium 122. The location for the key-value pair may comprise a location where the data value of the key-value pair is stored in the non-volatile recording medium 122, a location where the key-value pair (e.g., the data value and an associated key, a key-value pair and associated key-value metadata, or the like) is stored in the non-volatile recording medium 122, or another location in the non-volatile recording medium 122, depending on a format in which the key-value store module 306 stores a key-value pair. For example, in one embodiment, the key-value store module 306 may store a key together with an associated data value in the non-volatile recording medium 122. In another embodiment, the key-value store module 306 may store a data value in the non-volatile recording medium without an associated key, since the key may be encoded in a logical address associated with the key-value pair. The key-value store module 306 is described in greater detail below with regard to FIGS. 5 and 6.

The non-volatile memory device 120 (or a VSU of the non-volatile memory device 120), in certain embodiments, may cache data for a backing store device or other client 116, as described above with regard to the cache interface 133. A backing store device may have a larger capacity than the non-volatile memory device 120, but may have slower access times, lower throughput, lower bandwidth, or the like. In certain embodiments, if the expiry module 206 expires or invalidates cached data from the non-volatile memory device 120, the cache module 308 and/or a client 116 that owns the cached data treat the expiration as a cache eviction, maintaining the data in an associated backing store. In a further embodiment, the cache module 308 or a client 116 that owns the cached data is configured to expire corresponding data (e.g., the data that was expired or invalidated) from a backing store associated with the non-volatile memory medium 122 in response to the expiry module 206 expiring or invalidating the data from the non-volatile memory medium 122, so that the expiration is persistent for both the non-volatile memory device 120 and the associated backing store.

In one embodiment, the storage capacity recovery module 310 recovers storage capacity of the non-volatile memory device 120 one or more storage divisions at a time. A storage capacity recovery operation, in various embodiments, may comprise a garbage collection operation, a grooming operation, or the like. A storage division, in one embodiment, includes a logical or physical erase block or other predefined division. For flash memory, an erase operation on an erase block writes ones to every bit in the erase block. This may be a lengthy process compared to a program operation which starts with a location being all ones, and as data is written, some bits are changed to zero. However, where the non-volatile memory medium 122 is not flash memory or has flash memory where an erase cycle takes a similar amount of time as other operations, such as a read or a program, the expiry module 206 may erase the data of a storage division as it expires data, instead of the storage capacity recovery module 310, or the like.

In one embodiment, allowing the expiry module 206 to mark data as invalid rather than actually erasing the data in response to the data satisfying an expiration period and allowing the storage capacity recovery module 310 to recover the non-volatile memory medium 122 associated with invalid data, increases efficiency because, as mentioned above, for flash memory and other similar storage an erase operation may take a significant amount of time. Allowing the storage capacity recovery module 310 to operate autonomously and opportunistically within the non-volatile memory device 120 provides a way to separate erase operations from reads, writes, and other faster operations so that the non-volatile memory device 120 operates efficiently.

The storage capacity recovery module 310 may preserve the temporal and/or sequential order of data across a storage capacity recovery event or operation as the storage capacity recovery module 310 copies data forward on the sequential, log-based writing structure, using epoch identifiers or the like. In certain embodiments, the storage capacity recovery module 310 is configured to copy data from a temporal range and one or more associated epoch identifiers forward to an append point of the sequential, log-based writing structure. In a further embodiment, the storage capacity recovery module 310 may copy data from a recovered temporal range of data or epoch to a different append point of the sequential, log-based writing structure than an intake append point, so that data from different temporal ranges or epochs remain separate in the sequential, log-based writing structure, or the like.

In embodiments where the storage capacity recovery module 310 preserves just a latest version of data for each temporal range or epoch, the storage capacity recovery module 310 may copy the latest version of data written in a temporal range or epoch forward to an append point of the sequential, log-based writing structure, and may erase, delete, remove, trim, or otherwise clear older invalid versions of the data during a storage capacity recovery operation. In other embodiments, the storage capacity recovery module 310 may preserve and copy forward multiple versions of data, both valid and invalid, from a temporal range or epoch.

As described above, in certain embodiments, the expiry module 206 cooperates with the storage capacity recovery module 310 to identify data within a storage region the storage capacity recovery module 310 has selected for a storage capacity recovery operation. The expiry module 206, in one embodiment, cooperates with the pre-groom module 316 to perform a pre-groom scan of a storage region selected for a storage capacity recovery operation, prior to the storage capacity recovery operation. The expiry module 206 and/or the pre-groom module 316 may identify data of the storage region during the pre-groom scan, check or examine expiry metadata for identified data of the storage region, and mark data invalid if an expiration period for the data has been satisfied. In this manner, the storage capacity recovery module 310 may assist in expiring data by recovering storage capacity of the storage region without writing the expired data to another storage region, so that the expired data is erased during the storage capacity recovery operation.

In one embodiment, the restart module 318 is configured to rebuild a logical-to-physical mapping structure (e.g., the metadata 135 described above) for the non-volatile memory device 120 in response to a restart event. A logical-to-physical mapping structure maps logical addresses for data to physical locations in the non-volatile memory medium 122 where the data is stored. A restart event, in certain embodiments, may comprise an unclean shutdown, a power loss, or another unexpected interruption in power to the non-volatile memory device 120, which may not give the restart module 318 enough time to save a checkpoint copy of the logical-to-physical mapping structure or metadata 135 to the non-volatile memory medium 122. In a further embodiment, a restart event may include a normal, planned reboot or shutdown, and the restart module 318 may rebuild the logical-to-physical mapping structure after a normal, planned reboot or shutdown.

To rebuild the logical-to-physical mapping structure, in certain embodiments, the restart module 318 is configured to scan the sequential, log-based writing structure of the non-volatile memory medium 122, creating mappings for valid data in the log-based writing structure. The log storage module 137 and/or the write module 204, in certain embodiments, stores a logical identifier (e.g., an LBA, an LBA range, or the like) as metadata with the data in the non-volatile memory medium 122, in packet headers or another predefined location, so that the restart module 318 may determine both the logical address of data and the physical location of the data based just on a recovery scan of the sequential, log-based writing structure, with little or no additional information.

In one embodiment, to provide a faster, more efficient restart, or the like, the restart module 318 may be configured cooperate with the expiry module 206 and/or the metadata module 302 to determine one or more expiration periods for data scanned in the sequential, log-based writing structure and whether the expiration periods have been satisfied. In this manner, in certain embodiments, the restart module 318 may exclude entries for expired data from the rebuilt logical-to-physical mapping structure. Excluding entries for expired data, in one embodiment, may reduce a volatile memory footprint of the rebuilt logical-to-physical mapping structure, may increase a speed and/or efficiency with which the restart module 318 may rebuild or reconstruct the logical-to-physical mapping structure, or the like.

FIG. 4A depicts one embodiment of a sequential, log-based writing structure 400 storing epoch identifiers 424, 428, 430, 432, 434 or other time sequence information to preserve a temporal order of data in the log-based writing structure 400 across storage capacity recovery operations or the like. The sequential, log-based, append-only writing structure 400, in the depicted embodiment, is a logical representation of the physical non-volatile memory medium 122 of the non-volatile memory device 120. In certain embodiments, the non-volatile memory device 120 stores data sequentially, appending data to the log-based writing structure 400 at one or more append points 404.

The non-volatile memory device 120, in a further embodiment, uses a storage space recovery, grooming, and/or garbage collection process, such as the storage capacity recovery module 310 described above, that re-uses non-volatile memory medium 122 storing deallocated, unused, and/or expired logical blocks. Non-volatile memory medium 122 storing deallocated, unused, and/or expired logical blocks, in the depicted embodiment, is added to an available storage pool 406 for the non-volatile memory device 120. By clearing invalid and/or expired data from the non-volatile memory device 120, as described above, and adding the physical storage capacity corresponding to the cleared data back to the available storage pool 406, in one embodiment, the log-based writing structure 400 is cyclic, ring-like, and has a theoretically infinite capacity.

In the depicted embodiment, the append point 404 progresses around the log-based, append-only writing structure 400 in a circular pattern 402. In one embodiment, the circular pattern 402 wear balances the non-volatile memory medium 122, increasing a usable life of the non-volatile memory medium 122. In the depicted embodiment, the storage capacity recovery module 310 has marked several blocks 408, 410, 412, 414 as invalid, represented by an "X"

marking on the blocks 408, 410, 412, 414. The storage capacity recovery module 310, in one embodiment, will recover the physical storage capacity of the invalid blocks 408, 410, 412, 414 and add the recovered capacity to the available storage pool 406. In other embodiments, the storage capacity recovery module 310 may preserve at least a most recent copy of data from each temporal range or epoch in the invalid blocks 408, 410, 412, 414, so that the non-volatile memory controller 124 may provide access to snapshots or other previous states of the data to satisfy time sequence requests or the like. In the depicted embodiment, modified versions of the blocks 408, 410, 412, 414 have been appended to the log-based writing structure 400 as new blocks 416, 418, 420, 422 in a read, modify, write operation or the like, allowing the original blocks 408, 410, 412, 414 to be recovered.

An epoch identifier 424, 428, 430, 432, 434 or other time sequence indicator may include an indicator, marker, label, flag, field, packet, or other data structure identifying or preserving a temporal and/or sequential order for data in the sequential, log-based writing structure 400, to indicate a time at which the data was received and/or written, or the like. An epoch identifier 424, 428, 430, 432, 434 may be absolute (e.g., a timestamp), relative (e.g., a sequence number), or may otherwise indicate a temporal and/or sequential order for data.

In the depicted embodiment, the write module 204 and/or the metadata module 302 marks or associates data with an epoch identifier 424, 428, 430, 432, 434 by inserting the epoch identifier 424, 428, 430, 432, 434 into the sequential, log-based writing structure 400 between temporal ranges or epochs of data. An epoch identifier 424, 428, 430, 432, 434, in the depicted embodiment, marks the beginning of a new temporal range or epoch of data, with all data between the epoch identifier 424, 428, 430, 432, 434 and a subsequent or next epoch identifier 424, 428, 430, 432, 434 belonging to the temporal range.

In the depicted embodiment, the storage capacity recovery module 310 has performed a storage capacity recovery operation to recover blocks 408a and 426a which stored data 'A' and 'B' associated with the epoch identifier 424. To preserve the temporal and/or sequential order of data in the sequential, log-based writing structure 400, so that expiry metadata remains accurate at a new location or the like, the temporal order module 304, in cooperation with the storage capacity recovery module 310, has copied or written forward the valid, unexpired data of the temporal range associated with the epoch identifier 424 (e.g., data 'A' and 'B') from blocks 408a, 426a to blocks 408b and 426b at the append point 404 of the sequential, log-based writing structure 400, along with the epoch identifier 424. Even though data 'A' of block 408a has been invalidated by new data, the storage capacity recovery module 310 retains data 'A' of block 408a during the storage capacity recovery operation, so that the non-volatile memory controller 124 may provide access to both versions of data 'A' 408, 420.

In this manner, the data remains associated with the epoch identifier 424 across storage capacity recovery events, so that the epoch identifier continues to indicate an age of the data so that the expiry module 206 may expire the data at the correct expiration period, and so that the sequential, log-based writing structure 400 continues to maintain a temporal and/or sequential order of data. Additionally, by marking the beginning and/or ending of temporal ranges or epochs of data with epoch identifiers 424, 428, 430, 432, 434, in one embodiment, the sequential, log-based writing structure 4A preserves a temporal and/or sequential order for data without the overhead of storing an epoch identifier 424, 428, 430, 432, 434 in each packet or other predefined data segment.

FIG. 4B depicts another embodiment of a sequential, log-based writing structure 440 storing epoch identifiers 442, 444 or other time sequence indicators. In the sequential, log-based writing structure 440, the write module 204 and/or the metadata module 302 inserts or stores an epoch identifier 442, 444 into each individual data segment, such as a packet, an ECC chunk or block or codeword, a logical page, a physical page, a logical erase block, a physical erase block, an LBA data block or range of data blocks, a file, a data object, or another predefined segment of data.

In the depicted embodiment, because each individual packet or other data segment includes an epoch identifier, the storage capacity recovery module 310 may recover the storage capacity of block 408a, with data 'A', copying or writing forward data 'A' to a block 408b at the append point 404, without copying or writing forward data 'B' from block 426a, which may be associated with the same epoch identifier 444. Data packets or other data segments of data 'A' in block 408a store epoch identifiers 442, which the storage capacity recovery module 310 copies or writes forward with data 'A' to the new block 408b. The matching epoch identifiers 444a for data 'B' remain associated with data 'B', in each data packet or other data segment, in block 426a. In certain embodiments, storing an epoch identifier 442, 444 in each packet or other data segment may simplify storage capacity recovery operations for the storage capacity recovery module 310, as temporal ranges or epochs may be separated, without the data losing its association with the epoch identifiers 442, 644, so that the expiry module 206 may expire the data at the correct expiration period even after the data is moved.

Figure 5:
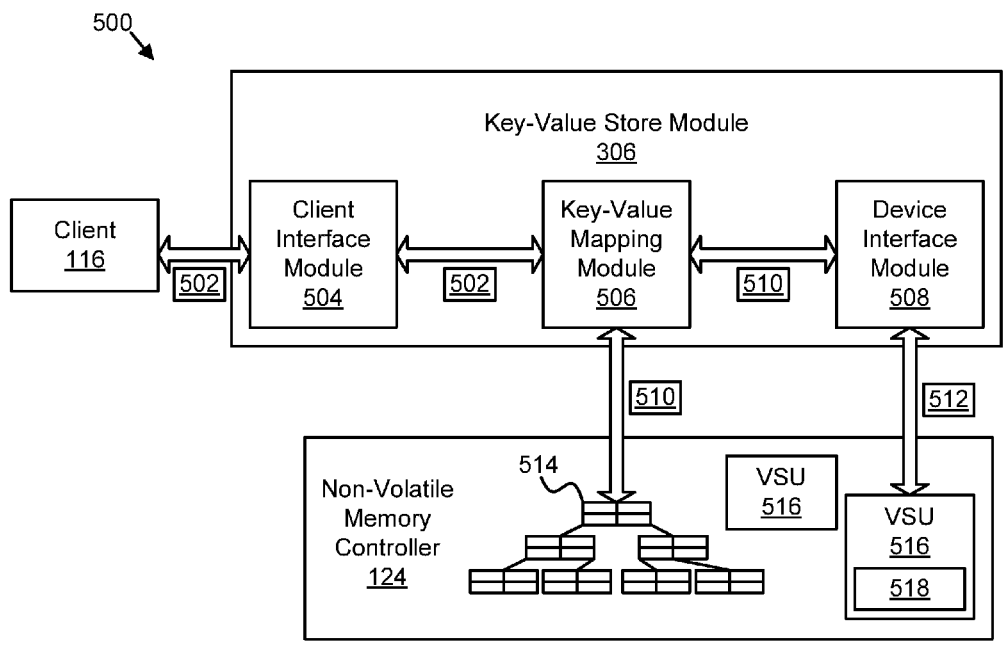
FIG. 5 is a schematic block diagram illustrating one embodiment of a system for a key-value store.

FIG. 5 depicts one embodiment of a system 500 for a key-value store 518. As described above, in various embodiments, the data expiration module 150 may be used with one or more general purpose non-volatile memory devices 120, with a key value store 518, with a cache, and/or with other types of non-volatile memory devices 120. The system 500 of FIG. 5 is one example embodiment, in which the data expiration module 150 is configured to expire key-value pairs from a key-value store 518. The description may be equally applicable to other embodiments, in which the data expiration module 150 is configured to expire logical blocks of user workload data, cached data, data objects, or other types or granularities of data. The system 500, in the depicted embodiment, includes a client 116, a key-value store module 306, and a non-volatile memory controller 124. The non-volatile memory controller 124 maintains one or more virtual storage units 516 or VSUs 516, as described above.

Each VSU 516 is a data structure maintained by the non-volatile memory controller 124 to logically divide the non-volatile memory device 120 into independent storage units or containers, so that the non-volatile memory device 120 may be shared between multiple clients 116, for multiple uses, or the like. Each VSU 516 may have different properties and attributes, such as different use cases, different expiration periods or parameters, different quality-of-service (QoS) levels, different priority levels, different logical address space types (e.g., sparse logical address space, contiguous logical address space), different replication attributes, different logical and/or physical storage capacities, or the like. Clients 116, in certain embodiments, may independently create, delete, and manage VSUs 516. The non-volatile memory controller 124 may store metadata defining attributes of the VSUs 516 in volatile and/or nonvolatile storage of the computing device 110, the non-volatile memory device 120, or the like.

Attributes and metadata of a VSU 516 may be used to ensure high availability, to provide failover, or the like. For example, if a first VSU 516 encounters a fault, error, or otherwise fails, the non-volatile memory controller 124 may use the attributes and metadata of the failed first VSU 516 to migrate one or more clients 116 to a second VSU 516. The attributes of a failed VSU 516 may allow the non-volatile memory controller 124 to manage storage capacity allocation for a newly allocated VSU 516, to select a suitable VSU 516 as a failover candidate, or the like.

While the VSUs 516 depicted in FIG. 5 are logically associated with a single non-volatile memory controller 124, with physical non-volatile memory media 122 provided by a single non-volatile memory device 120, in another embodiment, the system 500 may include a plurality of non-volatile memory devices 120, a plurality of non-volatile memory controllers 124, or the like, each with associated VSUs 516. The non-volatile memory controller 124, in certain embodiments, may use a plurality of VSUs 516 in cooperation. For example, the non-volatile memory controller 124 may stack, layer, aggregate, export, and/or replicate one or more VSUs 516 to extend across multiple software layers, across data networks, across non-volatile memory devices 120, or the like. In other embodiments, the non-volatile memory controller 124 may stripe or minor data to multiple VSUs 516, provide snapshots of one or more VSUs 516, or the like.

While each VSU 516 may be logically independent, in one embodiment, data stored in different VSUs 516 is intermingled in the non-volatile memory medium 122. For example, the non-volatile memory medium 122 may store data using a sequential, append-only, log-based writing structure, and the non-volatile memory controller 124 may write data of several VSUs 516 sequentially to an append point of the log-based writing structure as the key-value store module 306 receives data values from clients 116. Because data from each VSU 516, in certain embodiments, is written to the same append point, the data from different VSUs 516 may be dispersed throughout the log-based writing structure on the non-volatile memory medium 122.

By logically separating the data from different VSUs 516 but intermingling the data physically, data from each VSU 516 receives the same data protection characteristics. For example, the non-volatile memory controller 124, a write data pipeline, and/or a read data pipeline 108 provide certain data protection characteristics for data, such as error correction, garbage collection or storage capacity recovery, power cut or power loss protection, or the like to protect the integrity of data on the non-volatile memory medium 122. The non-volatile memory controller 124 applies these data protection characteristics to data regardless of which VSU 516 logically corresponds to the data.

Another benefit of storing data for VSUs 516 in a sequential, append-only, log-based writing structure as the non-volatile memory controller 124 receives data from clients 116, is that one or more of the VSUs 516 may be thinly provisioned, having a larger logical address space 134 than the physical storage capacity of the non-volatile memory medium 122. In a thinly provisioned embodiment, the non-volatile memory controller 124 may allocate physical storage capacity of the non-volatile memory medium 122 to a VSU 516 as the physical storage capacity is used, instead of allocating the entire storage capacity of the VSU 516 initially when the VSU 516 is created. Additionally, the non-volatile memory controller 124 may export a logical address space 134 for a VSU 516 to a client 116 (e.g., a sparse address space) that is much larger than the physical storage capacity of the non-volatile memory medium 122. The non-volatile memory controller 124 may provision the logical address space 134 when creating a VSU 516, and allocate physical storage capacity to the VSU 516 dynamically in response to a write request from a client 116.

The key-value store module 306, in the depicted embodiment, includes a client interface module 504, a key-value mapping module 506, and a device interface module 508. In one embodiment, the key-value mapping module 506 maps or otherwise associates data values with unique keys to form a key-value store 518.

The key-value store 518 maps keys to data values so that a client 116 can access the data values using the keys. The key-value mapping module 506, in certain embodiments, uses a logical-to-physical address mapping structure for the non-volatile memory device 120 to map keys to physical locations of the data values on the non-volatile memory medium 122. A location, as used herein, may comprise a physical address in the non-volatile memory medium 122, a logical address which the non-volatile memory medium 122 may map, interpret, or translate to a physical address, or another indicator of which storage elements of the non-volatile memory medium 122 store data. For example, the key-value mapping module 506 may use the logical-to-physical address mapping structure described above. In one embodiment, the key-value mapping module 506 does not maintain a separate key-value index or other mapping structure for a key-value store 518, but instead uses a logical address space 134 of the non-volatile memory device 120 (or of a VSU 516) and the logical-to-physical address mapping structure of the logical-to-physical translation layer 512 to map keys to associated data values stored on the non-volatile memory medium 122.

In order to determine a logical address for a data value based on an associated key, in one embodiment, the key-value mapping module 506 performs one or more predefined or known transforms on the key, thereby converting the key to the logical address. A known transform may include a hash function, a truncation, a bit-masking, or another transformation or conversion that yields consistent, repeatable, deterministic, results. In one embodiment, a hash function may include a unity hash function where the output equals the input and the key-value mapping module 506 does not modify the key when converting the key to a logical address or key address portion of a logical address, thereby using the key itself as a logical address or key address portion. The key-value mapping module 506 may map a key to a logical address for an associated data value in response to a key-value command from a client 116 with the key, such as a PUT command to write or store a data value for the key, a GET command to retrieve the data value for the key, a DELETE command to delete the data value for the key, or the like. In certain embodiments, the key-value mapping module 506 converts or maps a key to a logical address without a key-value index or another key-value specific mapping structure. The key-value mapping module 506 may use the logical-to-physical address mapping structure and a logical address determined from a key to determine a physical location on the non-volatile memory medium 122 for a data value associated with the key.

In one embodiment, the logical address space 134 is sparse and/or thinly provisioned, and the key-value mapping module 506 determines a logical address for a key by dividing the logical address space 134 (for the non-volatile memory device 120, for a VSU 516, or the like) into one or more key address ranges and one or more value address ranges. The key-value mapping module 506 may divide a logical address space 134 by separating logical addresses of the logical address space 134 into a key address portion and a value address portion. Dividing the logical address space 134 and/or logical addresses of the logical address space 134, in certain embodiments, allows the key-value store module 306 to efficiently store data values of variable lengths while still using consecutive keys.

The key-value mapping module 506, in one embodiment, sizes the key address range and the value address range to accommodate a maximum data value size. For example, the key-value mapping module 506 may space addresses in the value address range at least a maximum data value size apart from each other. The maximum data value size, in certain embodiments, comprises a maximum allowed or supported size of a data value. In a further embodiment, the maximum data value size comprises a maximum allowed or supported size of a data value and key-value metadata stored with the data value such as an associated key, a size of the data value, an identifier of a client 116 or user associated with the data value, file system metadata, access control metadata, or the like.

The key-value mapping module 506, in one embodiment, assigns a key to a data value in response to receiving a write request or PUT command for the data value. In another embodiment, clients 116 manage their own keys and a client 116 sends a key to the key-value mapping module 506 with a write request or PUT command for a data value. The key, in certain embodiments, comprises a logical address or key address portion of a logical address directly, without manipulation. In a further embodiment, the key-value mapping module 506 maps or converts a key into a logical address or key address portion of a logical address. For example, the key-value mapping module 506 may perform a predefined transform, such as a hash function, on a key to convert the key to a logical address or key address portion of a logical address.

The key-value mapping module 506, in one embodiment, appends, concatenates or otherwise combines a determined key address portion of a logical address with a value address portion to form the logical address for an associated data value. In certain embodiments, the key-value mapping module 506 may use the same value address portion for each logical address, such as binary zeros, binary ones, or another predefined constant value. In another embodiment, the key-value mapping module 506 may logically use a predefined constant value for the value address portion of each logical address, but may store a different value in the bits for the value address portion in the logical-to-physical address mapping structure. In certain embodiments, the key-value mapping module 506 may store an additional hash value or other metadata in the value address portion.

In one example embodiment, if the non-volatile memory device 120 (or a VSU 516) has a sparse logical address space 134 of 248 blocks or sectors, with 48 bit logical addresses and a block/sector size of 512 bytes, to support a maximum data value size of about 1 mebibyte, the key-value mapping module 506 may segment logical addresses into two portions, a 37 bit key address portion and an 11 bit value address portion. In the example, by using a predetermined number of bits for the value address portion, 11 bits in the example, and using a predefined constant value for each value address portion (e.g., all zeros, all ones, a predefined value or bit pattern), the logical addresses for each data value are spaced the maximum data value size apart, 1 mebibyte in the example. In other embodiments, a sparse logical address space 134 of 264 blocks, 2128 blocks, or other sizes may be used, with the corresponding logical addresses segmented into a key address portion and a value address portion or the like.

In this manner, the key-value mapping module 506 logically segments or divides the sparse logical address space 134 (or a key-value portion of the sparse logical address space 134) into segments or chunks of a predetermined size, such as the maximum data value size, without allocating or using physical non-volatile memory medium 122 until a data value is written to the medium 122. By combining a key address portion and a value address portion to convert a key to a logical address, in certain embodiments, the key-value mapping module 506 allows values to have variable sizes while allowing clients 116 to use consecutively numbered keys.

In other embodiments, instead of using a key address portion and a value address portion, the key-value mapping module 506 may perform another transform on a key to convert the key into a logical address for the associated data value. For example, the key-value mapping module 506 may append a predefined sequence of bits to a key, add a predefined offset to a key, perform a predefined bitwise logic operation on a key, perform a hash on a key, or perform another predefined transform on a key to determine a logical address from the key. In embodiments where the key-value mapping module 506 uses one or more predefined or known transforms to convert a key to a logical address, whether using a key address portion and a value address portion or not, the key-value mapping module 506 may determine a physical location for a data value directly using the logical-to-physical address mapping structure, without a key-value index or other key-value specific structure to map keys to logical addresses or the like.

The key-value mapping module 506 may use a key directly, either as a key address portion of a logical address or as a logical address itself, or, in other embodiments, may perform a predefined transform such as a hash function to convert a key to a key address portion or to a logical address. In embodiments where the key-value mapping module 506 uses a non-unique transform such as a hash function to convert a key to a key address portion of a logical address or to a logical address, the key-value mapping module 506 may use one or more collision management techniques to handle collisions. For example, the key-value mapping module 506, in response to converting a received key to a logical address using a key address portion or otherwise, retrieves a stored key from key-value metadata stored at the logical address and compares the stored key to the received key to determine whether or not a collision has occurred. If the stored key does not match the received key, typically a hash collision has occurred. In certain embodiments, the sparse logical address space 134 is sufficiently large and the hash function is selected to evenly hash keys over an available key address range so that collisions occur infrequently, for example, in one embodiment, about 2% of the time or less.

The key-value mapping module 506, in one embodiment, may use one or more collision resolution techniques such as chaining, linear probing, quadratic probing, double hashing, or the like in response to a collision. For example, in response to a collision for a key-value pair, the key-value mapping module 506 may re-hash the key, the key and a pool identifier, or the like to a different logical address or logical address range. The key-value mapping module 506, in certain embodiments, may re-hash the key, the key and a pool identifier, or the like multiple times, until an available, collision-free logical address or logical address range is located. In another embodiment, the key-value mapping module 506 may send an error message or otherwise alert the key-value store module 306, a requesting client 116, or the like of a collision. In other embodiments, where a key-value store 518 operates as a cache for a key-value backing store or the like, in response to a subsequent data value colliding with a stored data value, the subsequent data value may take the place of the stored data value, invalidating and/or evicting the stored data value from the key-value store 518.

In one embodiment, the existence of an entry for a logical address in the logical-to-physical address mapping structure denotes membership of the key-value pair associated with the logical address in the key-value store 518 and storage of the associated data value on the non-volatile memory medium 122 of the non-volatile memory device 120. The key-value mapping module 506, in certain embodiments, dynamically updates the logical-to-physical address mapping structure as clients 116 add or remove key-value pairs from the key-value store 518. The key-value store 518, in other embodiments, may be substantially static, and pre-populated with data values and associated keys, by a manufacturer, vendor, administrator, or the like.

For new key-value pairs, in one embodiment, the key-value mapping module 506 determines, generates, or otherwise assigns a key for the new data value. In another embodiment, the key-value mapping module 506 receives a key for a new key-value pair from a requesting client 116 with a write request or PUT command for the new pair, and clients 116 may manage keys themselves. A key may comprise a binary or hexadecimal value, a string, an integer, or another data type that may have different unique values. As described above, in one embodiment, a key may comprise a logical address, a portion of a logical address, or the like. In other embodiments, a key may be converted, transformed, or hashed to a logical address or portion of a logical address.

In certain embodiments, a key for a data value may be a combination of several sub-values, such as a client identifier, a pool identifier, a key identifier, or the like. A client identifier identifies or is otherwise associated with a requesting client 116. In one embodiment, clients 116 of the same type share a client identifier. By sharing the same client identifier, clients 116 of the same type, in certain embodiments, may access the same data values in the key-value store 518. Sharing data values may allow clients 116 to maintain consistent settings or to otherwise coordinate or synchronize data. For example, if a non-volatile memory device 120 is installed in or otherwise paired with a first computing device 110, a device driver or other client 116 may access data values, store data values, and the like, and when the non-volatile memory device 120 is installed in or otherwise paired with a second computing device 110, a client 116 of the same client type may access the same data values, such as license information, settings, cache binding information, software, recovery information, or the like. In other embodiments, a client identifier may be unique, even among clients 116 of the same type, so that the clients 116 may maintain separate data values, without interference from other clients 116. Alternatively, clients 116 of the same type may share a client identifier, but may use unique pool identifiers for private data values that are not shared between clients 116, even of the same type.

A pool identifier identifies, or is otherwise associated with, a group of data values that have a common characteristic. Pool identifiers provide organization for data values, allowing the key-value mapping module 506 and/or clients 116 to classify, manage, or otherwise organize data values in the key-value store 518. For example, a client 116 may use one pool identifier for startup configuration settings and another pool identifier for runtime configuration settings, or the like. In one embodiment, a client 116 may assign and manage pool identifiers for data values associated with the client 116. In another embodiment, the key-value mapping module 506 assigns and manages pool identifiers for clients 116. In certain embodiments, the key-value mapping module 506 may encode a pool identifier into a logical address, as an offset within a range of logical block addresses, as the value address portion of a logical block address, hashing a pool identifier with a key and including the resulting hash value in a logical block address, or the like.

A key identifier identifies an associated data value, differentiating between data values with the same client identifier and pool identifier. The key-value mapping module 506 may assign and manage key identifiers and/or a client 116 may assign and manage key identifiers. Key identifiers may be assigned sequentially, or in another manner to ensure uniqueness. Keys are unique for a key-value store 518; and key identifiers are unique for a given client identifier and pool identifier to ensure that the keys remain unique. The size of a key and any sub-values such as client identifiers, pool identifiers, and key identifiers, may be selected based on a size of a logical address space 134 for the non-volatile memory device 120 or VSU 516, a number of anticipated data values, a number of anticipated clients 116, a number of anticipated pools per client 116, a number of anticipated data values per pool, or the like.

In certain embodiments, a key for a data value may be a known value that is predefined for several clients 116, so that each of the clients 116 may access the data value. In another embodiment, the key-value store module 306 may list keys for a client 116.

In one embodiment, the client interface module 504 receives key-value commands from one or more clients 116 over a key-value store interface or the like. For example, the client interface module 504 may provide a key-value API for clients 116 to access a key-value store 518. As described above, clients 116 may access the key-value store module 306 from the computing device 110, over a data network, or the like. The client interface module 504 may provide a key-value store interface to clients 116 internally within the computing device 110, over a data network, or the like.

The client interface module 504 may support various key-value commands, examples of which are described in greater detail below with regard to FIG. 7A. For example, in certain embodiments, the client interface module 504 may support one or more of a CREATE command, a POOL CREATE command, an OPEN command, a PUT command, a GET command, a DELETE command, a DELETE POOL command, a DELETE ALL command, a BEGIN command, a NEXT command, a GET CURRENT command, a GET STORE INFO command, a SET STORE METADATA, a GET POOL INFO command, a SET POOL METADATA command, a GET KEY INFO command, a REGISTER NOTIFICATION HANDLER command, a CLOSE command, a DESTROY command, a BATCH GET command, a BATCH PUT command, and/or other key-value commands.

In one embodiment, the device interface module 508 performs one or more operations on the non-volatile memory device 120 for the key-value store module 306. The device interface module 508, in certain embodiments, implements key-value commands from the client interface module 504 on the non-volatile memory device 120 using primitive operations that the non-volatile memory controller 124 provides. Examples of primitive operations that the device interface module 508 may use to implement key-value commands are described in greater detail below with regard to FIG. 7B.

In one embodiment, the device interface module 508 stores a data value to the non-volatile memory device 120, in response to a PUT command or the like for an associated key, using an ATOMIC WRITE operation. An ATOMIC WRITE operation, in certain embodiments, provides variable size writes to accommodate variable sized data values. The device interface module 508, in a further embodiment, in response to a GET command or the like for an associated key, uses an EXISTS operation to determine whether the non-volatile memory medium 122 stores a data value for the key. In response to a DELETE command or the like for a key, in one embodiment, the device interface module 508 uses a PTRIM operation to delete, erase, remove, or otherwise clear the associated data value from the non-volatile memory medium 122. By using primitive operations such as ATOMIC WRITE, EXIST, and PTRIM, in certain embodiments, the device interface module 508 stores and retrieves variable sized data values efficiently without wasting physical storage capacity of the non-volatile memory medium 122. Further, primitive operations such as ATOMIC WRITE, EXIST, and PTRIM, in one embodiment, obviate the need for additional key-value data structures such as a key-value index or the like, allowing the key-value mapping module 506 to use the logical-to-physical address mapping structure to map keys to physical locations for values without the overhead of additional levels of lookups or record keeping.

In one embodiment, the key-value store module 306 cooperates with the non-volatile memory controller 124 to optimize storage capacity recovery operations or other grooming operations for the non-volatile memory medium 122. For example, the key-value store module 306 may track key-value pairs for the non-volatile memory controller 124 so that the non-volatile memory controller 124 performs storage capacity recovery operations or other grooming operations for the entire key-value pair, so that key-value pair data and/or metadata stored on the non-volatile memory medium 122 is complete, is not separated, or the like.

The client 116, in the depicted embodiment, communicates one or more key-value store commands to the client interface module 504 over a key-value store interface provided by the client interface module 504, such as a key-value store API. Examples of key-value store commands, in various embodiments, may include one or more of a CREATE command, a POOL CREATE command, an OPEN command, a PUT command, a GET command, a DELETE command, a DELETE POOL command, a DELETE ALL command, an ITERATOR NIT command, a BEGIN command, a NEXT command, a GET CURRENT command, an ENUMERATE command, an EXPORT command, a GET STORE INFO command, a SET STORE METADATA, a GET POOL INFO command, a SET POOL METADATA command, a GET KEY INFO command, a SET KEY METADATA command, a REGISTER NOTIFICATION HANDLER command, a CLOSE command, a DESTROY command, a BATCH GET command, a BATCH PUT command, and the like.

Certain key-value store commands include a key 502, which the client 116 may send to the client interface module 504 as a parameter to a key-value store command. In the depicted embodiment, the client interface module 504 sends the key 502, with other key-value store command data or instructions, to the key-value mapping module 506, which determines a logical address 510 based on the received key 502. As described above, the key-value mapping module 506 may use a key 502 as a logical address 510, may hash a key 502 into a logical address 510, may hash a key 502 into a key address portion of a logical address 510 and add a value address portion to complete the logical address 510, or the like.

The key-value mapping module 506, in the depicted embodiment, is in communication with the non-volatile memory controller 124 to access and/or manipulate a logical-to-physical address mapping structure 514. The key-value mapping module 506, as described above, may cooperate with a logical-to-physical translation layer 512 of the non-volatile memory controller 124 to store logical addresses 510 for key-value pairs in the logical-to-physical address mapping structure 514, to map logical addresses 510 for key-value pairs to physical locations of the data values on the non-volatile memory medium 122, to determine whether a key-value pair for a logical address 510 exists and is stored on the non-volatile memory medium 122, or the like. The key-value mapping module 506, in one embodiment, sends a determined logical address 510 for a data value to the device interface module 508.

In other embodiments, the key-value mapping module 506 and/or the client interface module 504 may send a physical location of a data value 512 on the non-volatile memory medium 122, other key-value store command data or instructions, or the like to the device interface module 508. The device interface module 508 executes one or more primitive operations that the non-volatile memory controller 124 provides, such as WRITE, ATOMIC WRITE, EXISTS, RANGE EXISTS, PTRIM, READ, RANGE READ, CONDITIONAL WRITE, or the like, to service a key-value store command from the client 116. The device interface module 508 may cooperate with the client interface module 504 to translate a key-value store command to one or more primitive operations of the non-volatile memory controller 124. The device interface module 508 may return a data value 512, key-value metadata 512, or the like to the client interface module 504 to include in a key-value store command response to the client 116.

The expiry module 206, in certain embodiments, expires keys and associated data values from a key-value store 518, thereby deleting, erasing, removing, trimming, or otherwise clearing the expired keys and associated data values from the non-volatile memory medium 122 as described above. In one embodiment, the expiry module 206 expires key-value pairs or other data automatically in response to an expiration event, such as an expiration request from a client 116, a key-value quota being satisfied, a predefined amount of time occurring since creation of a key-value pair, a predefined amount of time occurring since access of a key-value pair, a storage capacity recovery event for the non-volatile memory device 120, or the like. The expiry module 206, in one embodiment, expires key-value pairs by age, expiring older keys in favor of newer keys. For example, in response to a key-value quota or another predefined threshold number of key-value pairs being satisfied, the expiry module 206 may expire the oldest key-value pair so that the total number of key-value pairs does not exceed the key-value quota or other predefined threshold number of key-value pairs.

In one embodiment, the expiry module 206 cooperates or coordinates with a garbage collection or storage capacity recovery process of the non-volatile memory device 120 to expire key-value pairs as described above with regard to the storage capacity recovery module 310. In a typical storage capacity recovery process, the storage capacity recovery module 310 selects an erase block of the non-volatile memory medium 122, such as a physical erase block, logical erase block, or the like, for storage capacity recovery, copies valid data from the selected erase block forward to retain the valid data in the non-volatile memory medium 122, and erases the selected erase block which becomes available to be reused to store other data. For example, the storage capacity recovery module 310 may copy valid data forward to an append point of a sequential, log-based writing structure preserved in the non-volatile memory medium 122, or the like.

In certain embodiments, instead of copying key-value pairs forward to retain the key-value pairs as part of a storage capacity recovery process for an erase block, the expiry module 206 expires key-value pairs stored in an erase block in response to a storage capacity recovery event for the erase block. In one embodiment, the storage capacity recovery module 310 performs storage capacity recovery in a first-in-first-out (FIFO) order beginning with the oldest data at a tail of the sequential, log-based writing structure and proceeding toward the newest data at a head of the sequential, log-based writing structure. In this manner, key-value pairs are expired in a FIFO order, with older key-value pairs being expired prior to newer key-value pairs in a temporal order.

Expiring key-value pairs instead of copying them forward, in one embodiment, reduces write amplification in the non-volatile memory device 120. As described above, write amplification is the rewriting or moving of data during a storage capacity recovery or garbage collection process, causing the same data originally written in response to a storage request to be written more than once. Write amplification can increase the number of writes of a non-volatile memory device 120, consume write bandwidth of a non-volatile memory device 120, reduce a usable lifetime of a non-volatile memory device 120, and otherwise reduce performance of a non-volatile memory device 120. In certain embodiments, reducing write amplification by expiring key-value pairs instead of copying them forward allows the key-value store 518 to operate at or near peak performance indefinitely with little or no write amplification.

In certain embodiments, the notification module 304 notifies a client 116, the key-value store module 306, or the like in response to expiring a key-value pair, as described above. In a further embodiment, the notification module 304 enumerates to a client 116, the key-value store module 306, or the like which key-value pairs the expiry module 206 has expired, listing the expired key-value pairs or the like. The notification module 304, in various embodiments, may perform a callback to enumerate expired key-value pairs, may maintain a log of expired key-value pairs, or the like.

Figure 6:
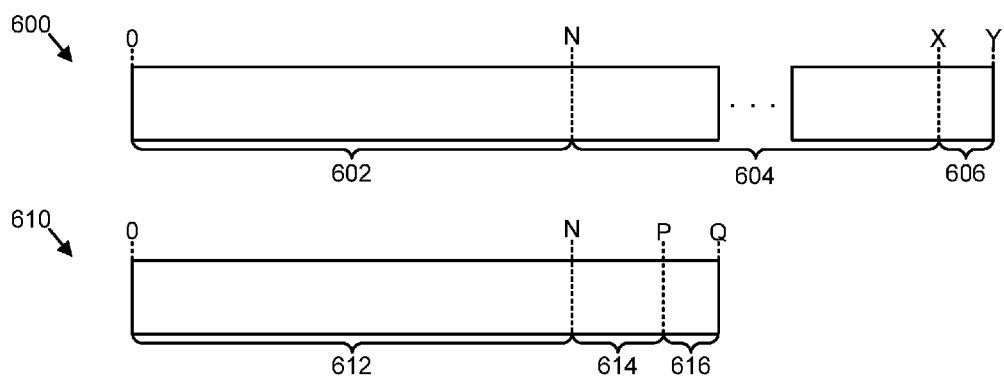
FIG. 6 is a schematic block diagram illustrating one embodiment of a logical address space and a physical storage capacity for a non-volatile memory.

FIG. 6 depicts one embodiment of a logical address space 600 and a physical storage capacity 610 for a non-volatile memory device 120. In the depicted embodiment, the logical address space 600 is a sparse address space that is larger than the physical storage capacity 610 of the non-volatile memory device 120. A first set of LBAs 602 corresponds to a reported capacity 612 of the non-volatile memory device 120. The reported capacity 612, in certain embodiments, is the capacity that is discoverable and useable by clients 116, operating systems, computer devices 110, and the like. The first set of LBAs 602 is available to clients 116 over a block device interface.

The reported capacity 612, in the depicted embodiment, is less than the total available physical storage capacity 610 of the non-volatile memory device 120, as the non-volatile memory device 120 includes reserve capacity 614 for bad block substitutions, for storing metadata, for storing invalid data, and the like and key-value store capacity 616 for storing key-value store data. The reserve capacity 614 and the key-value store capacity 616, in certain embodiments, may be managed together, as available metadata capacity or system capacity, and adjusted based on capacity demands. While the reported capacity 612, the reserve capacity 614, and the key-value store capacity 616 are depicted logically as being separated, as described above, in certain embodiment, workload data, key-value store data, system metadata, and the like use the same write path and are written to an append point of a sequential, log-based writing structure, so that the workload data, key-value store data, system metadata, and the like are intermingled on the physical non-volatile memory medium 122. Further, in the depicted embodiment, each set of LBAs 602, 604, 606 is illustrated as a contiguous range of LBAs. In other embodiments, the first set of LBAs 602 and the key-value store set of LBAs 606 may be noncontiguous, interspersed using one or more hashing functions or other address mapping functions, or otherwise intermingled through the logical address space 600, instead of being disposed in contiguous ranges.

In the depicted embodiment, a key-value store set of LBAs 606 comprises a restricted set of LBAs 606 and is a part of a larger restricted set of LBAs 604, 606. Alternatively, in another embodiment, the key-value store set of LBAs 606 may be a single restricted set of LBAs 606, with the set of LBAs 604 between LBA N and LBA X not being a restricted set. A restricted set of LBAs is inaccessible using a block device interface. In one embodiment, the size of the key-value store set of LBAs 606 is dynamic, and may grow or shrink dynamically as data values are added to or removed from the key-value store 518. In another embodiment, the size of the key-value store set of LBAs 606 is static. For example, a client 116, in one embodiment, may request a certain size for a key-value store set of LBAs 606 using a CREATE command, requesting a certain number of keys, requesting a certain size of key-value store index, or the like and the size for the key-value store set of LBAs 606 may be based on the client request.

In another embodiment, the key-value store set of LBAs 606 is associated with a VSU 516 of a key-value store 518. The size of the key-value store set of LBAs 606, in certain embodiments, is selected not to exceed the reserve capacity 614 of the non-volatile memory device 120. In other embodiments, the size of the key-value store set of LBAs 606 may be allowed to grow into the reported capacity 612. In one embodiment, the size allocated for the key-value store set of LBAs 606 is a logical or virtual allocation and does not use or reserve physical storage capacity 610 of the non-volatile memory device 120 until data values are stored in the key-value store set of LBAs 606 and the corresponding LBAs are mapped to physical locations on the non-volatile memory device 120 that store the data values.

In embodiments where one or more additional LBAs 604 exist in the logical address space 600, the additional LBAs 604 may be restricted or unrestricted. The additional LBAs 604, in one embodiment, may be unused. In another embodiment, the additional LBAs 604 may be allocated to additional key-value stores 518, or for other functions of the non-volatile memory device 120.

Figure 7:
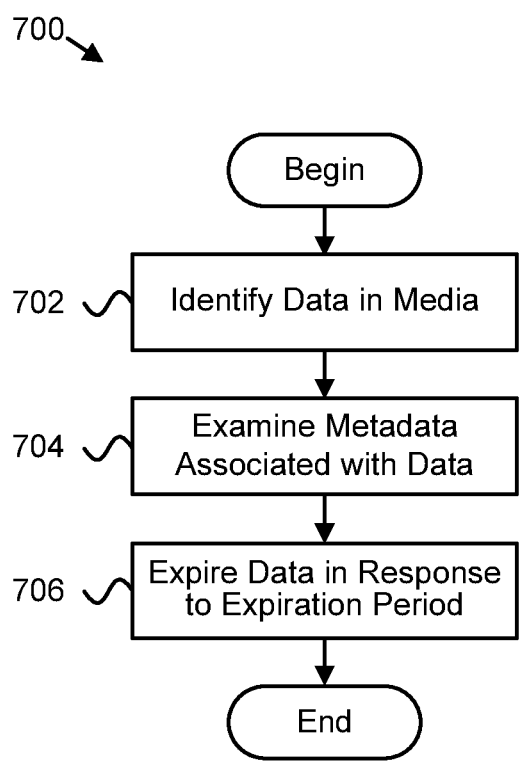
FIG. 7 is a schematic flow chart diagram illustrating one embodiment of a method for data expiry.

FIG. 7 depicts one embodiment of a method 700 for data expiry. The method 700 begins and the expiry module 206 identifies 702 data stored in non-volatile recording medium 122. The expiry module 206 examines 704 metadata associated with the data in the non-volatile recording medium 122. The expiry module 206 expires the data from the non-volatile recording medium 122 in response to the metadata indicating that an expiration period for the data has been satisfied and the method 700 ends.

Figure 8:
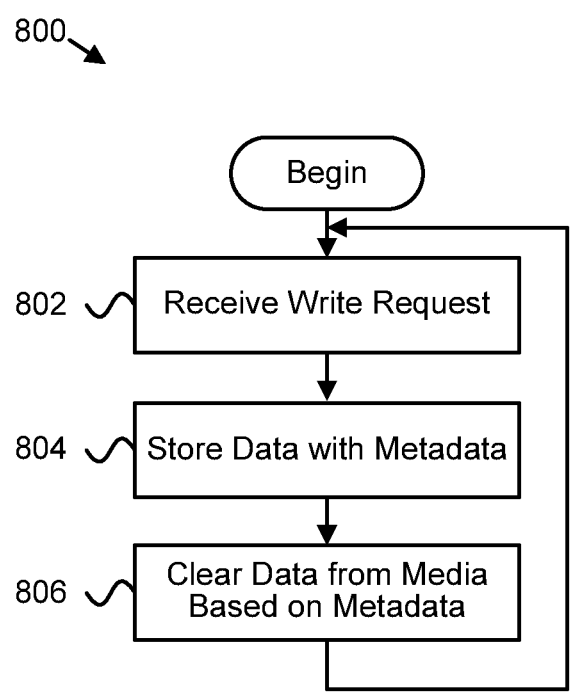
FIG. 8 is a schematic flow chart diagram illustrating another embodiment of a method for data expiry.

FIG. 8 depicts another embodiment of a method 800 for data expiry. The storage request module 202 receives 802 a write request to store data in a non-volatile memory medium 122. The write request, in certain embodiments, includes an expiration indicator for the data. The write module 204 stores 804 the data with metadata for the data in the non-volatile memory medium 122. The metadata, in certain embodiments, is based on the expiration indicator. The expiry module 206 clears 806 the data from the non-volatile memory medium 122 based on the metadata and the storage request module 202 continues to monitor 802 write requests.

Figure 9:
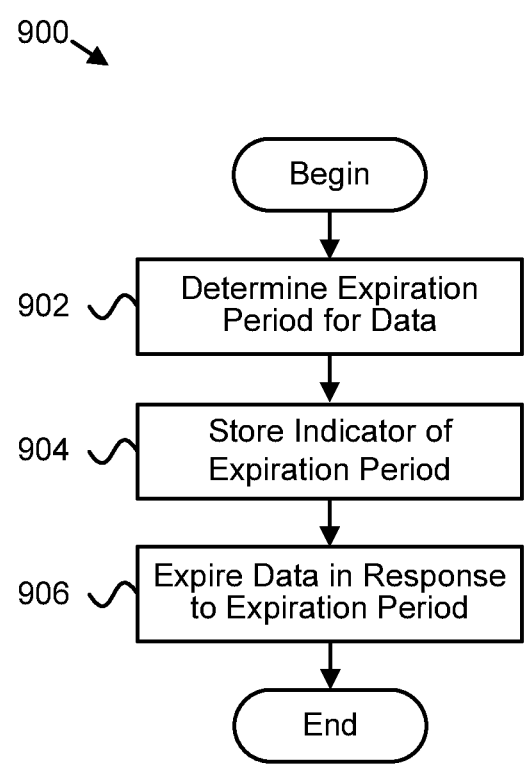
FIG. 9 is a schematic flow chart diagram illustrating a further embodiment of a method for data expiry.

FIG. 9 depicts a further embodiment of a method 900 for data expiry. The method 900 begins and the metadata module 302 determines 902 an expiration period for data stored in a non-volatile memory medium 122. The write module 204 stores 904 an indicator of the expiration period with the data in the non-volatile memory medium 122. The expiry module 206 expires the data from the non-volatile memory medium 122 in response to the expiration period being satisfied and the method 900 ends.

Figure 10:
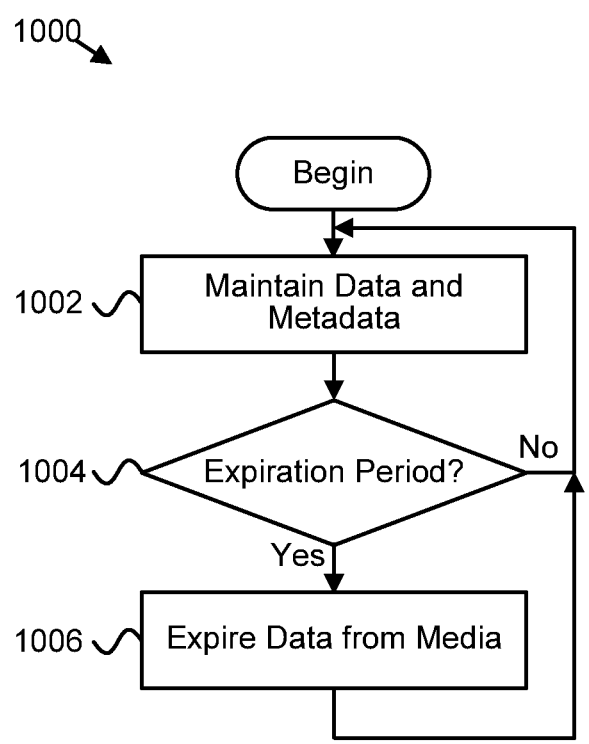
FIG. 10 is a schematic flow chart diagram illustrating an additional embodiment of a method for data expiry.

FIG. 10 depicts an additional embodiment of a method 1000 for data expiry. The method 1000 begins, and the metadata module 302 and/or the write module 204 maintain 1002 data and metadata associated with the data in a non-volatile recording medium 122. The expiry module 206 determines 1004 whether an expiration period for the data has been satisfied based on the metadata. If the expiry module 206 determines 1004 that the expiration period has not yet been satisfied, the metadata module 302 and/or the write module 204 continue to maintain 1002 the data and metadata. If the expiry module 206 determines 1004 that the expiration period has been satisfied, the expiry module 206 expires 10065 the data from the non-volatile recording medium 122 and the method 1000 continues.

Figure 11:
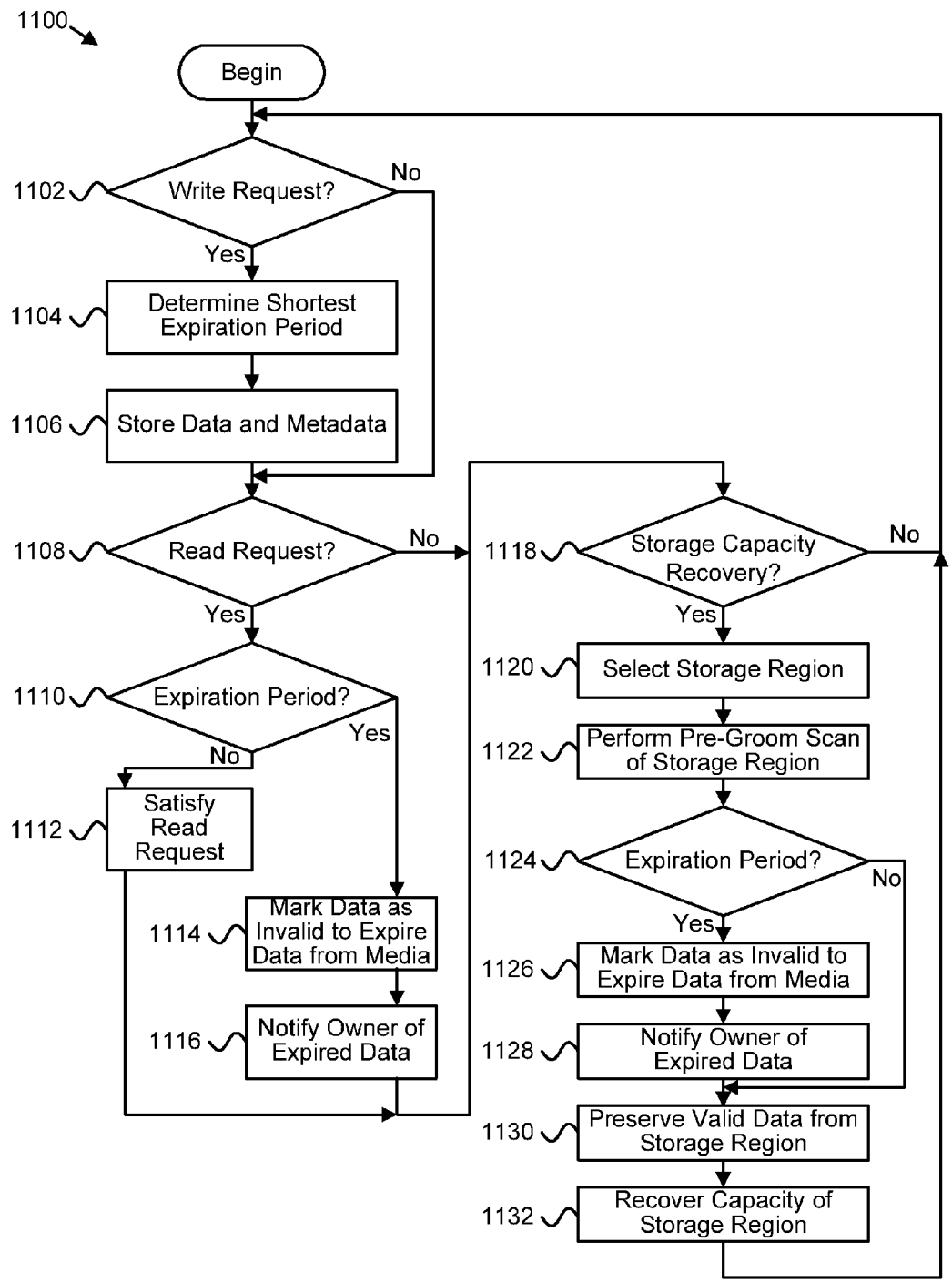
FIG. 11 is a schematic flow chart diagram illustrating another embodiment of a method for data expiry.

FIG. 11 depicts another embodiment of a method 1100 for data expiry. The method 1100 begins and the storage request module 202 monitors 1102 write requests for a non-volatile memory device 120. If the storage request module 202 receives 1102 a write request, the expiry module 206 and/or the metadata module 302 determine 1104 a shortest expiration period between a global expiration period for the non-volatile memory device 120 and an individual per I/O or per container expiration period for the data. The write module 204, in cooperation with the metadata module 302, stores 1106 the data and metadata for the data based on the determined 1104 shortest expiration period in the non-volatile memory device 120. If the storage request module 202 does not receive 1102 a write request, and/or in response to storing 1106 the data to satisfy the write request, the method 1100 continues.

In one embodiment, if the storage request module 202 receives 1108 a read request, the expiry module 206 determines 1110 whether an expiration period for data of the read request has been satisfied. If the expiration period is not satisfied 1110, the storage request module 202 satisfies 1112 the read request. In other embodiments, the storage request module 202 may satisfy 1112 the read request even if the expiration period is satisfied 1110, if the data is still available or the like.

If the expiration period is satisfied 1110, the expiry module 206 marks 1114 the data of the read request as invalid to expire the data of the read request from the non-volatile memory medium 122 of the non-volatile memory device 120, during a subsequent storage capacity recovery operation for the non-volatile memory medium 122. The notification module 304 notifies 1116 an owner of the data that the data has been expired 1114 and the method 1100 continues. If the storage request module 202 does not receive 1108 a read request, in response to satisfying 1112 the read request, or in response to expiring 1114 the data and/or notifying 1116 an owner, the method 1100 continues.

In another embodiment, if the storage capacity recovery module 310 determines 1118 to perform a storage capacity recovery operation, the storage capacity recovery module 310 selects 1120 a storage region such as a logical or physical erase block. The pre-groom module 316, in cooperation with the expiry module 206 or the like, performs 1122 a pre-groom scan of the selected 1120 storage region to identify data, examine metadata, and to determine 1124 based on the metadata whether an expiration period for any of the identified data has been satisfied. If the expiration period is satisfied 1124 for any identified data, the expiry module 206 marks 1126 the expired data as invalid to expire the data from the non-volatile memory medium 122 of the non-volatile memory device 120 during the storage capacity recovery operation 1118. The notification module 304 notifies 1128 an owner of the data that the data has been expired 1126. In other embodiments, as described above, the data expiration module 150 may not include a notification module 304, or the notification module 304 may not notify 1116, 1128 an owner in response to the expiry module 206 expiring 1114, 1126 data from the on-volatile memory medium 122.

The storage capacity recovery module 310 preserves 1130 valid, unexpired data from the selected 1120 storage region (e.g., copies, moves, or writes the data forward to an append point of the sequential, log-based writing structure) and recovers 1132 storage capacity of the selected 1120 storage region and the method 1100 continues. If the storage capacity recovery module 310 determines 1118 not to perform a storage capacity recovery operation, the method 1100 continues with the storage request module 202 continuing to monitor 1102 storage requests.

A means for maintaining data and metadata associated with the data in a non-volatile recording medium 122, in various embodiments, may include a log storage module 137, a data expiration module 150, a write module 204, a metadata module 302, a key-value store module 306, a cache module 308, a sequential, log-based writing structure 400, 440, a non-volatile memory controller 124, a non-volatile memory media controller 126, a non-volatile memory device 120, a non-volatile memory medium 122, a storage management layer 130, other logic hardware, and/or other executable code stored on a computer readable storage medium. Other embodiments may include similar or equivalent means for maintaining data and metadata associated with the data a in non-volatile recording medium 122.

A means for determining whether an expiration period for data has been satisfied based on metadata, in various embodiments, may include a data expiration module 150, an expiry module 206, a metadata module 302, a global expiry module 312, a fine-grained expiry module 314, a non-volatile memory controller 124, a non-volatile memory media controller 126, a non-volatile memory device 120, a storage management layer 130, other logic hardware, and/or other executable code stored on a computer readable storage medium. Other embodiments may include similar or equivalent means for determining whether an expiration period for data has been satisfied based on metadata.

A means for expiring data from a non-volatile recording medium 122 in response to determining that an expiration period for the data has been satisfied, in various embodiments, may include a data expiration module 150, an expiry module 206, a global expiry module 312, a fine-grained expiry module 314, a storage capacity recovery module 310, a non-volatile memory controller 124, a non-volatile memory media controller 126, a non-volatile memory device 120, a storage management layer 130, other logic hardware, and/or other executable code stored on a computer readable storage medium. Other embodiments may include similar or equivalent means for expiring data from a non-volatile recording medium 122 in response to determining that an expiration period for the data has been satisfied.

A means for performing a pre-groom scan of a storage region storing data in association with a storage capacity recovery operation for the storage region, in various embodiments, may include a data expiration module 150, an expiry module 206, a global expiry module 312, a fine-grained expiry module 314, a storage capacity recovery module 310, a pre-groom module 316, a non-volatile memory controller 124, a non-volatile memory media controller 126, a non-volatile memory device 120, a storage management layer 130, other logic hardware, and/or other executable code stored on a computer readable storage medium. Other embodiments may include similar or equivalent means for performing a pre-groom scan of a storage region storing data in association with a storage capacity recovery operation for the storage region.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A method comprising:
   receiving a write request to store data in a non-volatile recording medium, the write request comprising metadata associated with the data, the metadata comprising an expiration parameter of the data and one or more logical addresses identifying a storage location of the data in the non-volatile recording medium;
   storing the data and the metadata in the non-volatile medium, wherein at least a portion of the metadata is stored sequentially with the data;
   examining the metadata associated with the data stored in the non-volatile recording medium; and
   expiring the data identified by the one or more logical addresses from the storage location in the non-volatile recording medium in response to the expiration parameter indicating that an expiration period for the data has been satisfied.

2. The method of claim 1, wherein the examining the metadata comprises determining, based on time sequence information from the metadata, whether the expiration period for the data has been satisfied.

3. The method of claim 1, further comprising notifying a client associated with the data in response to the expiring the data.

4. The method of claim 1, wherein the identifying the storage location of the data further comprises selecting a storage region for a storage capacity recovery operation wherein the expiring the data comprises recovering storage capacity of the storage region without writing the data to another storage region.

5. The method of claim 4, wherein the identifying the storage location of the data and the examining the metadata are performed as part of a pre-groom scan of the storage region prior to the storage capacity recovery operation.

6. The method of claim 1, wherein the expiration period comprises a global expiration period for data of the non-volatile recording medium.

7. The method of claim 1, wherein the expiration period is associated with a container of the data, the container comprising one or more of a logical block, a logical block range, a key-value pair, a data packet, a data object, a file, an error correcting code (ECC) codeword, a physical page, a logical page, a physical erase block, a logical erase block, and a virtual storage unit.

8. The method of claim 1, wherein the data comprises a key-value pair comprising a key encoded into a portion of a logical address within a sparse logical address space for the non-volatile recording medium, the logical address mapped to a location for a value of the key-value pair in the non-volatile recording medium.

9. The method of claim 1, wherein the examining the metadata and the expiring the data are performed in response to a read request for the data.

10. The method of claim 1, wherein the expiration period comprises a shortest of a global expiration period for the non-volatile recording medium and an individual expiration period for the data.

11. The method of claim 1, wherein the metadata is stored in an erase block opener of an erase block of the non-volatile recording medium at initialization of the erase block prior to storing the data in the erase block.

12. The method of claim 1, wherein the metadata is stored with the data in a sequential, log-based writing structure of the non-volatile recording medium.

13. The method of claim 12, wherein the metadata comprises an epoch identifier associated with a temporal range of data in the sequential, log-based writing structure, the data being within the temporal range of data.

14. The method of claim 13, further comprising preserving an order of the temporal range of data across a storage capacity recovery event.

15. An apparatus comprising:
   a storage request module configured to receive a write request to store data in a storage device, the write request comprising metadata of the data, the metadata having an associated expiration indicator of the data and one or more logical addresses identifying a storage location of the data in the storage device;
   a write module configured to store the data and the metadata in the storage device, wherein at least a portion of the metadata is stored sequentially with the data; and
   an expiry module configured to invalidate the data identified by the storage location of the one or more logical addresses in the storage device based on the expiration indicator indicating that an expiration period for the data has been satisfied;
   wherein the storage request module, the write module, and the expiry module comprise one or more of logic hardware and executable code, the executable code being stored on a non-transitory computer readable storage medium.

16. The apparatus of claim 15, further comprising a notification module configured to notify a client associated with the data that the expiration period for the data has been satisfied.

17. The apparatus of claim 15, further comprising a cache module configured to expire the invalidated data from a backing store associated with the storage device in response to the expiry module invalidating the data from the storage device such that the invalidation is persistent.

18. A system comprising:
non-volatile storage hardware comprising a non-volatile storage medium;
a write module configured to:
receive a write request to store data in the non-volatile storage medium, the write request comprising metadata of the data, the metadata comprising an expiration parameter indicating a timeout period for at least a range of the data and one or more logical addresses identifying a storage location of the data in the non-volatile storage medium; and
preserve the data and the metadata together in a sequential, log-based writing structure of the non-volatile storage hardware; and
an expiry module configured to expire the data identified by the storage location of the one or more logical addresses in the non-volatile storage hardware in response to the expiration parameter indicating that the timeout period has been satisfied.

19. The system of claim 18, further comprising a host computing device in communication with the non-volatile storage hardware.

20. The system of claim 18, wherein the metadata comprises time sequence information indicating a time that the data was stored in the non-volatile recording medium.

21. A computer program product comprising a non-transitory computer readable storage medium storing computer usable program code executable to perform operations, the operations comprising:
receiving a write request to store data in a non-volatile memory medium, the write request comprising metadata of the data, the metadata comprising an indicator of an expiration period for the data and one or more logical addresses identifying a storage location of the data in the non-volatile storage medium;
storing the metadata sequentially with the data in the non-volatile memory medium; and
expiring the data identified by storage location of the one or more logical addresses from the non-volatile memory medium in response to the expiration period for the data being satisfied, the expiration period further comprising a global expiration period for the non-volatile memory medium, the global expiration period comprising an amount of time that the data is stored in the non-volatile memory medium before being expired.

22. The computer program product of claim 21, wherein the operations further comprise:
scanning the non-volatile memory medium to rebuild a logical-to-physical mapping structure in response to a restart event; and
excluding, from the rebuilt logical-to-physical mapping structure, entries for the expired data discovered in the scan.

23. An apparatus comprising:
means for receiving a write request, at a controller for the non-volatile recording medium, from a host computing device, for storing data in a non-volatile storage medium, the write request comprising metadata of the data, the metadata comprising an expiration parameter and a range of one or more logical block addresses identifying a storage location of the data in the non-volatile recording medium;
means for maintaining the data and the metadata in the non-volatile recording medium, the expiration parameter indicating an expiration period of the data;
means for determining whether the expiration period of the data has been satisfied based on the expiration parameter; and
means for expiring the data identified by the storage location of the range of the one or more logical block addresses from a range of one or more logical block addresses of the non-volatile recording medium in response to determining that the expiration period for the data has been satisfied.

24. The apparatus of claim 23, further comprising means for performing a pre-groom scan of a storage region storing the data in association with a storage capacity recovery operation for the storage region such that the storage capacity recovery operation recovers storage capacity of expired data without writing the expired data to another storage region.

25. An apparatus comprising:
a metadata module configured to:
receive a write request to store data in a non-volatile medium, the write request comprising metadata of the data, the metadata comprising an expiration indicator indicating an expiration period of the data and one or more logical addresses identifying a storage location of the data in the non-volatile medium;
store the data and the metadata in the non-volatile medium; and
examine the metadata associated with the data, the data stored in a non-volatile medium according to the one or more logical addresses; and
an expiry module configured to expire the data identified by the storage location of the one or more logical addresses from a range of one or more logical addresses of the non-volatile medium in response to the metadata module determining that the expiration period for the data has been satisfied, the expiration period comprising a global expiration period for the non-volatile medium, the global expiration period comprising an amount of time that the data is stored in the non-volatile medium before being expired;
wherein the metadata module and the expiry module comprise one or more of logic hardware and executable code, the executable code stored on a non-transitory computer readable storage medium.

26. The apparatus of claim 25, wherein the metadata module and the expiry module comprise one or more of logic hardware of a device comprising the non-volatile medium and a device driver for the device comprising the non-volatile medium.

27. The apparatus of claim 25, further comprising a storage capacity recovery module configured to identify the storage location of the data by selecting a storage region comprising the data for a storage capacity recovery operation and to preserve metadata associated with non-expired data of the storage region, the storage capacity recovery operation moving the non-expired data of the storage region.

* * * * *